United States Patent
Liu et al.

(10) Patent No.: US 10,495,860 B2
(45) Date of Patent: Dec. 3, 2019

(54) ZOOM LENS SYSTEM

(71) Applicant: ZHEJIANG DAHUA TECHNOLOGY CO., LTD., Hangzhou (CN)

(72) Inventors: Kai Liu, Hangzhou (CN); Feng Wang, Hangzhou (CN); Hongxing Ding, Hangzhou (CN); Xingming Zhang, Hangzhou (CN); Qian Zhang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 52 days.

(21) Appl. No.: 15/737,281

(22) PCT Filed: Jun. 16, 2016

(86) PCT No.: PCT/CN2016/086000
§ 371 (c)(1),
(2) Date: Dec. 16, 2017

(87) PCT Pub. No.: WO2016/202273
PCT Pub. Date: Dec. 22, 2016

(65) Prior Publication Data
US 2018/0373003 A1   Dec. 27, 2018

(30) Foreign Application Priority Data

Jun. 17, 2015 (CN) .......................... 2015 1 0340158
Jun. 17, 2015 (CN) ..................... 2015 2 0421140 U
(Continued)

(51) Int. Cl.
*G02B 15/14* (2006.01)
*G02B 15/177* (2006.01)
*G02B 13/18* (2006.01)

(52) U.S. Cl.
CPC .......... *G02B 15/142* (2019.08); *G02B 13/18* (2013.01); *G02B 15/177* (2013.01)

(58) Field of Classification Search
CPC ........ G02B 7/102; G02B 7/10; G02B 13/009; G02B 15/14; G03B 3/10
(Continued)

(56) References Cited

U.S. PATENT DOCUMENTS 4,367,927 A   1/1983 Fujii
4,701,034 A   10/1987 Mihara
(Continued)

FOREIGN PATENT DOCUMENTS

CN   202267773 U   6/2012
CN   103439784 A   12/2013
(Continued)

OTHER PUBLICATIONS

European Search Report in European Application No. 16811014.6 dated May 25, 2018, 15 pages.
(Continued)

*Primary Examiner* — Mohammed A Hasan
(74) *Attorney, Agent, or Firm* — Metis IP LLC

(57) ABSTRACT

A zoom lens system for providing high quality images with higher resolution includes a first lens group (110), an aperture stop (120), and a second lens group (130). The first lens group has a positive or negative refractive power, and includes at least two lens elements having a negative refractive power and at least on lens element having a positive refractive power. The second lens group has a positive refractive power. A distance between a first and second lens group is not fixed.

17 Claims, 23 Drawing Sheets

(30) Foreign Application Priority Data

| | | | |
|---|---|---|---|
| Jun. 26, 2015 | (CN) | ............ | 2015 1 0367784 |
| Jun. 26, 2015 | (CN) | ............ | 2015 2 0453994 U |
| Sep. 25, 2015 | (CN) | ............ | 2015 1 0622908 |
| Sep. 25, 2015 | (CN) | ............ | 2015 2 075238 U |

(58) Field of Classification Search
 USPC ............................................. 359/694
 See application file for complete search history.

(56) References Cited

U.S. PATENT DOCUMENTS

| | | | |
|---|---|---|---|
| 4,880,299 A | 11/1989 | Hamada | |
| 7,755,843 B2 | 7/2010 | Yamasaki | |
| 7,898,744 B2 | 3/2011 | Wada | |
| 9,229,204 B2 | 1/2016 | Li | |
| 2002/0126393 A1 | 9/2002 | Nasu et al. | |
| 2003/0138245 A1 | 7/2003 | Watanabe | |
| 2005/0259329 A1 | 11/2005 | Yagyu et al. | |
| 2006/0077565 A1* | 4/2006 | Tomioka | G02B 15/177 359/680 |
| 2007/0070520 A1 | 3/2007 | Kimura et al. | |
| 2008/0304162 A1 | 12/2008 | Yamasaki | |
| 2011/0038054 A1* | 2/2011 | Maeda | G02B 13/04 359/649 |
| 2014/0085513 A1 | 3/2014 | Tashiro et al. | |
| 2014/0125858 A1* | 5/2014 | Sugita | G02B 15/177 348/345 |
| 2015/0022907 A1 | 1/2015 | Yamamoto | |
| 2015/0146085 A1* | 5/2015 | Hatada | G02B 15/177 348/360 |
| 2015/0168694 A1 | 6/2015 | Suzuki et al. | |

FOREIGN PATENT DOCUMENTS

| | | |
|---|---|---|
| CN | 204807791 U | 11/2015 |
| CN | 204807794 U | 11/2015 |
| CN | 105182504 A | 12/2015 |
| CN | 204964860 U | 1/2016 |
| EP | 2725406 A2 | 4/2014 |
| JP | H10104514 A | 4/1998 |
| JP | H10115788 A | 5/1998 |
| JP | 2005316052 A | 11/2005 |
| JP | 2012008271 A | 1/2012 |
| JP | 2012008273 A | 1/2012 |
| JP | 2012073337 A | 4/2012 |
| JP | 2012173491 A | 9/2012 |
| JP | 2012242688 A | 12/2012 |
| JP | 2013186458 A | 9/2013 |
| RU | 2041479 C1 | 8/1995 |
| RU | 128355 U1 | 5/2013 |

OTHER PUBLICATIONS

The extended European search report in Europe Application No. 16811014.6 dated Aug. 9, 2018, 18 pages.
Herbert Gross et al., Aberration theory and correction of optical systems, Handbook of optical systems, 3:215-221,225-250(2007).
Herbert Gross et al., Aberration theory and correction of optical systems, Handbook of optical systems, 3:377-379(2007).
International Search Report in PCT/CN2016/086000 dated Nov. 3, 2016, 7 pages.
Written Opinion in PCT/CN2016/086000 dated Nov. 3, 2016, 6 pages.
First Office Action for Chinese Application No. 201510622908.0 dated Feb. 17, 2017, 10 pages.

* cited by examiner

Modulation Transfer Function, MTF

Distortion

ZOOM LENS SYSTEM

CROSS-REFERENCE TO RELATED APPLICATIONS

This application is a U.S. national stage of International Application No. PCT/CN2016/086000, filed on Jun. 16, 2016, which is based upon and claims priority from Chinese Patent Application No. 201510340158.8, filed on Jun. 17, 2015, Chinese Patent Application No. 201520421140.6, filed on Jun. 17, 2015, Chinese Patent Application No. 201510367784.6, filed on Jun. 26, 2015, Chinese Patent Application No. 201520453994.2, filed on Jun. 26, 2015, Chinese Patent Application No. 201510622908.0, filed on Sep. 25, 2015, and Chinese Patent Application No. 201520757238.9, filed on Sep. 25, 2015. Each of the above-referenced applications are expressly incorporated herein by reference to their entireties.

TECHNICAL FIELD

The present disclosure generally relates to optical imaging devices, more specifically relates to zoom lens systems having at least one optical lens.

BACKGROUND

Imaging devices, like digital cameras and surveillance TV cameras, conventionally use zoom lens systems to capture images of an object through one or more groups of lens. With increasing usage of Charge Coupled Device (CCD) and Complementary Metal Oxide Semiconductor (CMOS) in imaging devices, zoom lens systems with high resolution and wide field view are needed.

However, conventional zoom lens systems do not adequately achieve high resolution and wide field view. For zoom lens systems with two lens groups, the resolution in some focal lengths may be sacrificed. For zoom lens system with more than two lens groups, the manufacturing cost is relatively high due to a mechanism for driving the lens groups.

SUMMARY

In one aspect of the present disclosure is directed to a zoom lens system and/or a lens including the zoom lens system. The zoom lens system may include a first lens group, an aperture stop, and a second lens group having a positive refractive power. The first lens group may include at least two lens elements having a negative refractive power and at least one lens element having a positive refractive power. The second lens group may include a first lens element having a positive refractive power, a second lens element having a positive refractive power, a first lens component having a negative refractive power, a third lens element having a negative refractive power, a fourth lens element having a positive refractive power, a second lens component having a negative refractive power, a fifth lens element having a positive refractive power, and a sixth lens element having a negative refractive power. In some embodiments, the first lens component may include at least one lens element. In some embodiments, the second lens component may include at least one lens element. In some embodiments, the fifth lens element and the sixth lens element may be affixed to each other. In some embodiments, a distance between the first lens group and the second lens group may vary.

In some embodiments, the first lens element of the second lens group may be a biconvex lens, and a refractive index of the first lens element may be no less than 1.7.

In some embodiments, the second lens element of the second lens group may be a biconvex lens, an Abbe number of the second lens element of the second lens group may be greater than 80, and the second lens element and the first lens component of the second lens group may be affixed to each other.

In some embodiments, the first lens component of the second lens group may include a biconcave lens having a negative refractive power and a biconvex lens having a positive refractive power, and the biconcave lens and the biconvex lens may be affixed to each other.

In some embodiments, the third lens element of the second lens group may be a biconcave lens, an Abbe number of the third lens element of the second lens group may be greater than 65, and a refractive index of the third lens element of the second lens group may be less than 1.55.

In some embodiments, the fourth lens element of the second lens group may be a biconvex lens, and the third lens element and the fourth lens element of the second lens group may be affixed to each other.

In some embodiments, the second lens component of the second lens group may include a first meniscus lens having a positive refractive power, a second meniscus lens having a negative refractive power, and the first meniscus lens and the second meniscus lens may be affixed to each other.

In some embodiments, the fifth lens element of the second lens group may be a biconvex lens, and an Abbe number of the fifth lens element may be greater than 80.

In some embodiments, the sixth lens element of the second lens group may be a biconcave lens, an Abbe number of the sixth lens element of the second lens group may be less than that of the fifth lens element of the second lens group, and a refractive index of the sixth lens element of the second lens group may be greater than that of the fifth lens element of the second lens group.

In some embodiments, the first lens group may include a first meniscus lens having a negative refractive power, a biconcave lens having a negative refractive power, a second meniscus lens having a positive refractive power, and the convex surfaces of the first and second meniscus lenses may face against an image plane.

In some embodiments, the zoom lens system may satisfy $1.85 \leq |f_1|/(f_w \times f_t)^{1/2} \leq 2.25$, $f_1$ may be a focus length of first lens group, $f_w$ may be a shortest focus length of the zoom lens system, $f_t$ may be a longest focus length of the zoom lens system.

In some embodiments, the zoom lens system may satisfy $0.8 < f_2/f_w < 1.2$, $f_2$ may be a focus length of second lens group, wherein $f_w$ may be a shortest focus length of zoom lens system.

In some embodiments, the zoom lens system may satisfy $0.4 < N_n \times f_w/f_t < 0.55$, wherein $N_n$ may be an average refractive index of the meniscus lens having a negative refractive power and the biconcave lens having a negative refractive power, $f_w$ may be a shortest focus length of zoom lens system, and $f_t$ may be a longest focus length of zoom lens system.

In another aspect of the present disclosure is directed to a zoom lens system and/or a lens including the zoom lens system. The zoom lens system may include a first lens group, an aperture stop and a second lens group having a positive refractive power. The first lens group may include at least two lens elements of negative refractive power and at least one lens element of a positive refractive power. The second lens group may include a first lens element having a negative refractive power, a second lens element having a positive refractive power, a third lens element having a positive refractive power, a fourth lens element having a positive refractive power, a fifth lens element having a positive refractive power, and a sixth lens element having a negative refractive power. In some embodiments, the distance between the first lens group and the second lens group may be not fixed.

In some embodiments, the zoom lens system may satisfy $0.7<|F_{eff}/F_1|<1.7$, and $0.3<|F_{eff}/F_c|<1.2$, wherein Few may be an effective focal length of the zoom lens system, $F_1$ may be an effective focal length of the first lens group, and Fc may be an effective focal length of the second lens group.

In some embodiments, the first lens group may include a plano-concave lens and two meniscus lenses. The concave surface of the piano-convex lens may face an image plane, the convex surfaces of the two meniscus lenses may face against an image plane, and the two meniscus lenses may be affixed to each other.

In some embodiments, the first lens element of the second group may be a biconcave lens, the second lens element of the second group may be a biconvex lens, the third lens element of the second group may be a meniscus lens, the fourth lens element of the second group may be a biconvex lens, the fifth lens element of the second group may be a biconvex lens, and the sixth lens element of the second group may be a biconcave lens.

In some embodiments, the first lens element of the second group and the second lens element of the second group may be affixed to each other, and the fifth lens element of the second group and the sixth lens element of the second group may be affixed to each other.

In some embodiments, the first concave surface of one of the two meniscus lens and the second concave surface of the other one of the two meniscus lens may be integrated into a lens component by adhesive, and the lens component may have a positive refractive power In some embodiments, the concave surface of the first lens element of the second group and the convex surface of the second lens element of the second group may be integrated into a lens component by adhesive, and the lens component may have a negative refractive power.

In some embodiments, the convex surface of the fifth lens element of the second group and the concave surface of the sixth lens element may be integrated into a lens component by adhesive, and the lens component may have a positive refractive power.

In another aspect of the present disclosure is directed to a zoom lens system and/or a lens including the zoom lens system. The zoom lens system may include a first lens group, an aperture stop and a second lens group having a positive refractive power. The first lens group may include at least two lens elements having a negative refractive power, at least two lens elements having a positive refractive power at least one lens component having a positive refractive power, and the at least one lens component may include at least one lens element. The second lens group may include a first lens element having a positive refractive power, a first lens component having a negative refractive power, a second lens element having a positive refractive power, and a third lens element having a positive refractive power. In some embodiments, the first lens component may include at least one lens element, and the distance between the first lens group and the second lens group may be not fixed In some embodiments, the first lens group may include a first meniscus lens having a positive refractive power, a second meniscus lens having a negative refractive power, a biconcave lens having a negative refractive power, a second lens component having a positive refractive power, and a biconvex lens having a positive refractive power, and the convex surfaces of the first and second meniscus lenses may face against an image plane.

In some embodiments, the second lens component of the first lens group may include a third meniscus lens having a positive refractive power and a fourth meniscus lens having a negative refractive power, and the third meniscus lens and the fourth meniscus lens may be affixed to each other.

In some embodiments, the first lens component of the second lens group may include a biconcave lens having a negative refractive power and a biconvex lens having a positive refractive power, and the biconcave lens and the biconvex lens may be affixed to each other.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
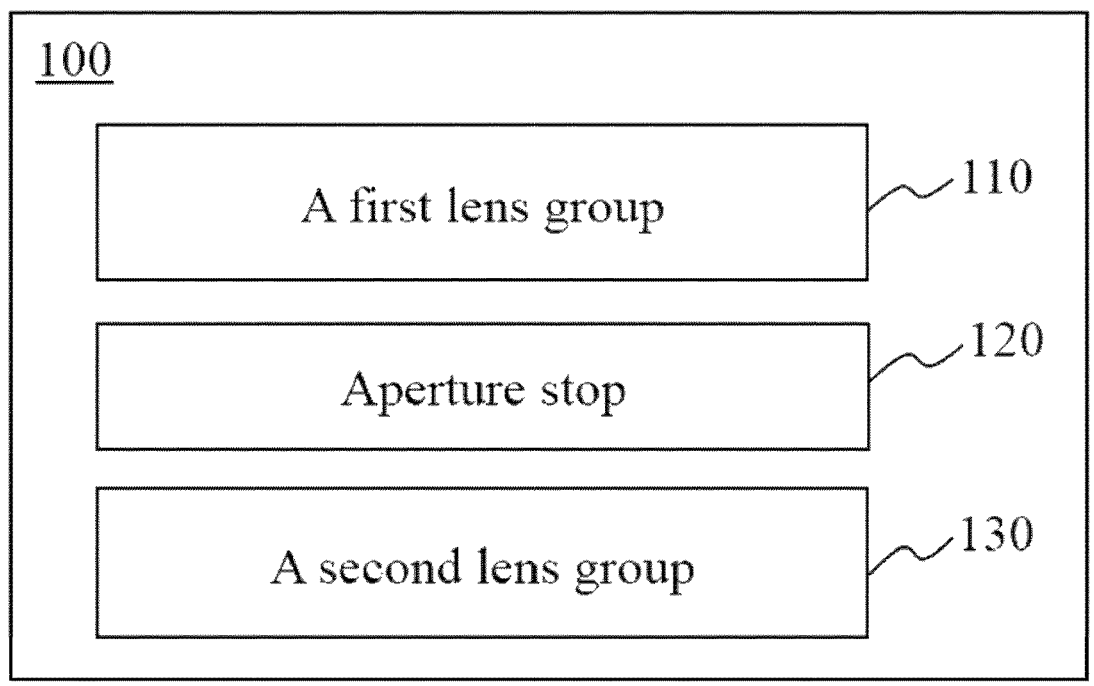
FIG. 1 is a block diagram illustrating an exemplary zoom lens system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The terms "lens element", "lens component", and "lens group relating to the detailed description of this application may be described as follows. The term lens element" herein may be a single transparent material that has two surfaces; both surfaces are curved, or one surface curved and the other is flat. The lens element may be used singly or combined with other lens element(s) in an optical instrument for focusing an object. The term "lens component" herein may be: either a single lens element spaced so far from other adjacent lens element(s) that the spacing cannot be neglected for purposes of computing the optical image forming properties of the lens elements; or two or more lens elements that have their adjacent lens surfaces that are overlapped or so close to each other that the spacing between adjacent lens surfaces of the lens elements can be neglected for purposes of computing the optical image forming properties of the lens elements. In some embodiments, some lens elements may also be lens components. The term "lens group" herein may be defined as a group of two or more lens elements or lens components in optical series along an optical axis.

The disclosure is directed to a zoom lens system for providing high quality images and/or videos with a higher resolution. For example, FIG. 1 illustrates an exemplary zoom lens system 100 including, in order from an object, a first lens group 110, an aperture stop 120, and a second lens group 130. Zoom lens system 100 may be implemented in an optical imaging device and configured to perform functions disclosed in this application.

First lens group 110 may include one or more lens elements and/or one or more lens components. The lens element(s) and/or lens components may have a negative or a positive refractive power. In some embodiments, first lens group 110 may include three lens elements. In some embodiments, first lens group 110 may include four lens elements and one lens component. The refractive power of first lens group 110 may be negative or positive.

Aperture stop 120 may be disposed between first lens group 110 and second lens group 130. Aperture stop 120 may be a hole or an opening through which light travels. More specifically, aperture stop 120 and focal length of zoom lens system may determine the cone angle of a bundle of rays that come to a focus in image plane 350. Aperture stop 120 may determine how collimated the admitted rays are. Aperture stop 120 may also determine how many of the incoming rays are actually admitted and thus how much light reaches image plane 350. The narrower the aperture, the darker the image for a given exposure time. In some embodiments, aperture stop 120 may be narrow, then highly collimated rays are admitted, resulting in a sharp focus at image plane 350. In some embodiments, aperture stop 120 may be wide, then highly uncollimated rays are admitted, resulting in a sharp focus only for rays coming from a certain distance. In some embodiments, the size of the aperture stop 120 may remain unchanged.

Second lens group 130 may include one or more lens elements and/or lens components. In some embodiments, the lens element(s) and/or lens component(s) may have one or more aspheric lens surfaces. The refractive power of second lens group 130 may be negative or positive. In some embodiments, second lens group 130 may include at least one lens element. For example, second lens group 130 may include ten lens elements. In some embodiments, second lens group 130 may include at least one lens element and at least one component. For example, second lens group 130 may include six lens elements and two lens components. As another example, second lens group 130 may include three lens elements and one lens component. In some embodiments, the two lens elements closest to an object side may have a positive refractive power. This would help to converge the light rays efficiently. In some embodiments, at least two elements of second lens group 130 may be affixed to each other. In some embodiments, the at least two elements may be disposed closest to image plane 350. In some embodiments, the at least two elements may reduce chromatic aberration of zoom lens system 100 and make zoom lens system 100 more stable. Such configurations of zoom lens system may provide a better imaging quality.

Refractive power of lens group(s) 110 and/or 130 may be determined based on the lens elements and/or the lens components. For example, the number, arrangement, combination, refractive power of the lens elements and/or the lens components in the lens groups may determine the refractive power of lens group(s) 110 and/or 130. The refractive power of the lens component may be determined based on the lens elements. For example, the number, arrangement, combination, refractive power of lens elements in the lens components may determine the refractive power of lens components.

The lens element may be a convex lens, a concave lens, or a flat lens. The convex lens may include a biconvex lens (convex on both sides), piano-convex (flat on one side and convex on the other side) lens, concavo-convex lens (meniscus lens, concave on one side and convex on the other side), etc. The concave lens may include biconcave lens (concave on both sides), piano-concave lens (flat on one side and concave on the other side), convexo-concave lens (meniscus lens, convex on one side and concave on the other side), etc. The lens component may include two or more lens elements. The convex lens may have a positive refractive power and may be used to converge the light rays. The concave lens may have a negative refractive power and may be used to diverge the light rays. The material of the lens elements (e.g., the convex lens, the concave lens and the flat lens) may be plastic, glass, crystal, resin, silica gel, etc. Materials used to manufacture lens may include K9(H-K9L, N-BK7), fused silica, fluoride (e.g., calcium fluoride, barium fluoride, magnesium fluoride, etc.), zinc selenide, silicon, germanium, etc.

The lens component may include different number and different kinds of lens elements. For example, a meniscus lens and a biconcave lens may be affixed to each other to form a lens component. As another example, a biconvex lens and a biconcave lens may be affixed to each other to form a lens component. The refractive power of a lens component may be negative or positive. It should be noted that the different combinations of lens elements are still within the scope of the current disclosure described above. Zoom lens system 100 may be used in fields of science and technology, military, etc. For example, zoom lens system 100 may be used in fields of safety monitoring system, film or television camera, digital cameras and surveillance TV cameras, projector, telescope, microscope, space exploration, missile test, tracking record of rocket, image detecting elements such as CCD (Charge Coupled Device) and CMOS (Complementary Metal Oxide Semiconductor), etc.

In some embodiments, two lens groups and one or more lens elements or lens components may be used in zoom lens system 100, which may reduce the cost of the lenses and the mechanisms in zoom lens system 100 and reduce the difficulty in fabricating lenses and assembling lenses. Other objectives, features and advantages of the invention will be further understood from the further technological features disclosed by the embodiments of the invention wherein there are shown and described preferred embodiments of this invention, simply by way of illustration of modes best suited to carry out the invention.

It should be noted that the above description about zoom lens system 100 is merely an example and should not be understood as the only embodiment. To those skilled in the art, after understanding the basic principles of the connection between different devices, the devices and connection between the devices may be modified or varied without departing from the principles. The modifications and variations are still within the scope of the current disclosure described above. For example, second lens group 130 may include seven lens elements and one lens component. A lens component may include two meniscus lenses.

Figure 2A:
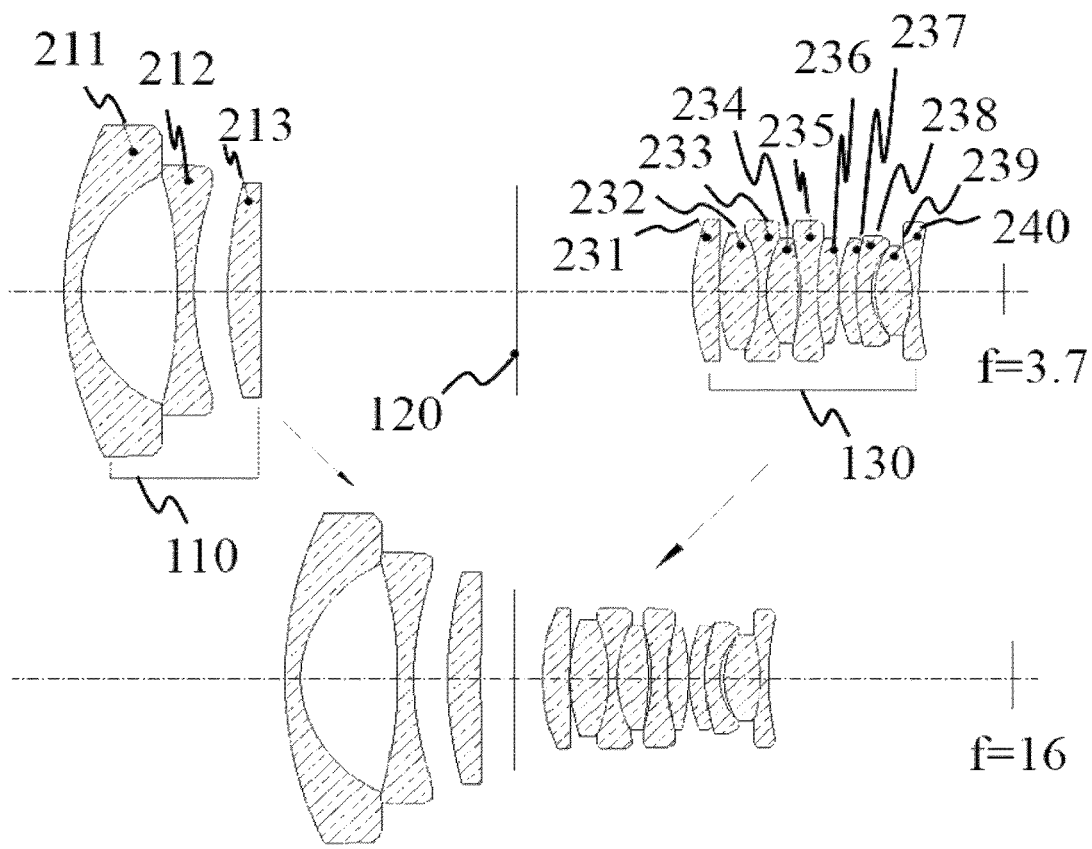
FIG. 2A is a schematic diagram illustrating an exemplary zoom lens system at long-focus and short-focus according to some embodiments of the present disclosure.

FIG. 2A is a schematic diagram illustrating an exemplary zoom lens system at long-focus and short-focus according to some embodiments of the present disclosure. FIGS. 2B through 2G are schematic diagrams illustrating exemplary zoom lens systems according to some embodiments of the present disclosure. As illustrated in FIG. 1, zoom lens system 100 may include a first lens group 110, an aperture stop 120, a second lens group, and other components (not shown). Further referring to FIG. 2A, first lens group 110 may include lens elements 211, 212, and 213. In some embodiments, first lens group 110 may have a negative refractive power. In some embodiments, lens element 211 may be a meniscus lens having a negative refractive power. Lens element 212 may be a concave lens having a negative refractive power. Preferably, lens element 212 may be a biconcave lens. Lens element 213 may be a meniscus lens having a positive refractive power. Preferably, the convex surfaces of lens elements 211 and 213 may face towards an object (i.e., the opposite direction to image plane 350 illustrated in FIG. 2A).

First lens group 110 with the above-described arrangement of lens elements, may reduce spherical aberration. First lens group 110 with three lens elements may reduce axis aberration and produce a better imaging quality.

In some embodiments, second lens group 130 may include six lens elements 231, 232, 235, 236, 239 and 240, and two lens components. The first lens component may include lens elements 233 and 234. The second lens component may include lens elements 237 and 238. In some embodiments, lens elements 231 and 232 may be convex lenses having a positive refractive power. For example, lens elements 231 and 232 may be biconvex lenses. In some embodiments, lens element 233 may be a concave lens having a negative refractive power. For example, lens element 233 may be a biconcave lens. In some embodiments, lens element 234 may be a convex lens having a positive refractive power. For example, lens element 234 may be a biconvex lens. In some embodiments, lens element 235 may be a concave lens having a negative refractive power. For example, lens element 235 may be a biconcave lens. In some embodiments, lens element 236 may be a convex lens having a positive refractive power. For example, lens element 236 may be a biconvex lens. In some embodiments, lens element 237 may be a convex lens having a positive refractive power. In some embodiments, lens element 238 may be a concave lens having a negative refractive power. For example, lens elements 237 and 238 may be meniscus lenses. In some embodiments, lens element 239 may be a convex lens having a positive refractive power. For example, lens element 239 may be a biconvex lens. In some embodiments, lens element 240 may be a concave lens having a negative refractive power. For example, lens element 240 may be a biconcave lens. In some embodiments, lens elements 239 and 240 may be rigidly affixed together to reduce chromatic aberration of the zoom lens system, make the zoom lens system more stable, and provide a better imaging quality.

Figure 2B:
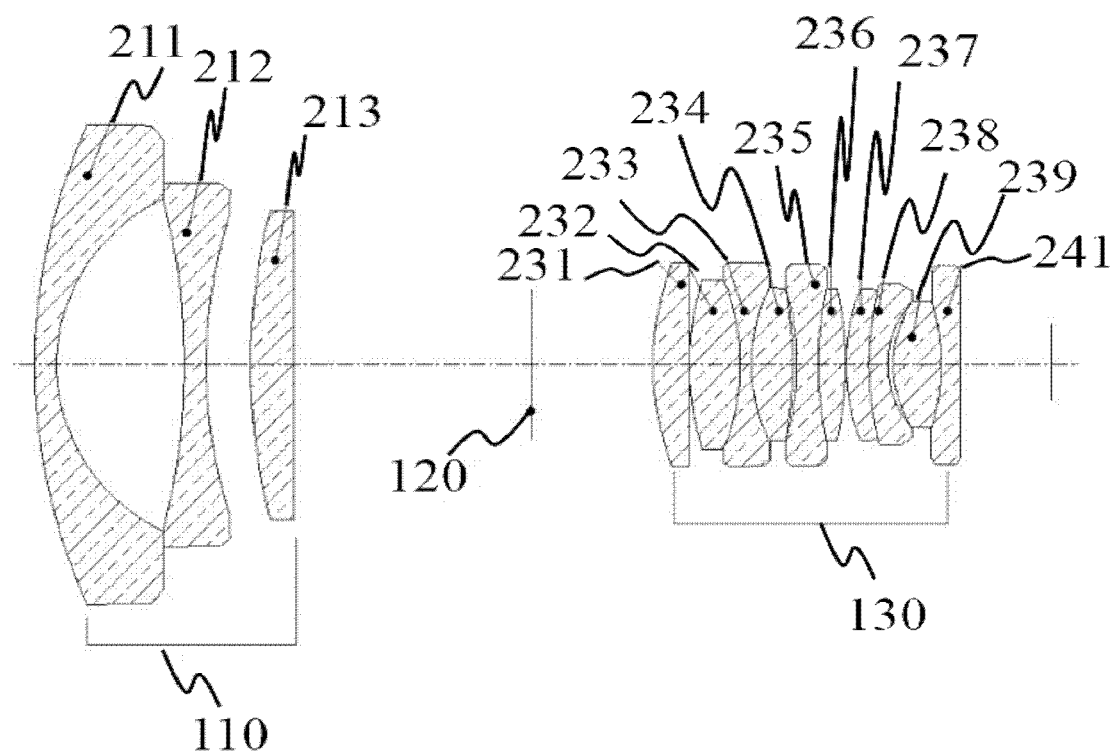
FIGS. 2B through 2G are schematic diagrams illustrating exemplary zoom lens systems according to some embodiments of the present disclosure.

In some embodiments, lens element 240 may be a piano-concave lens. As illustrated in FIG. 2B, lens element 241 in second lens group 130 may be a plano-concave lens having a negative refractive power.

Figure 2C:
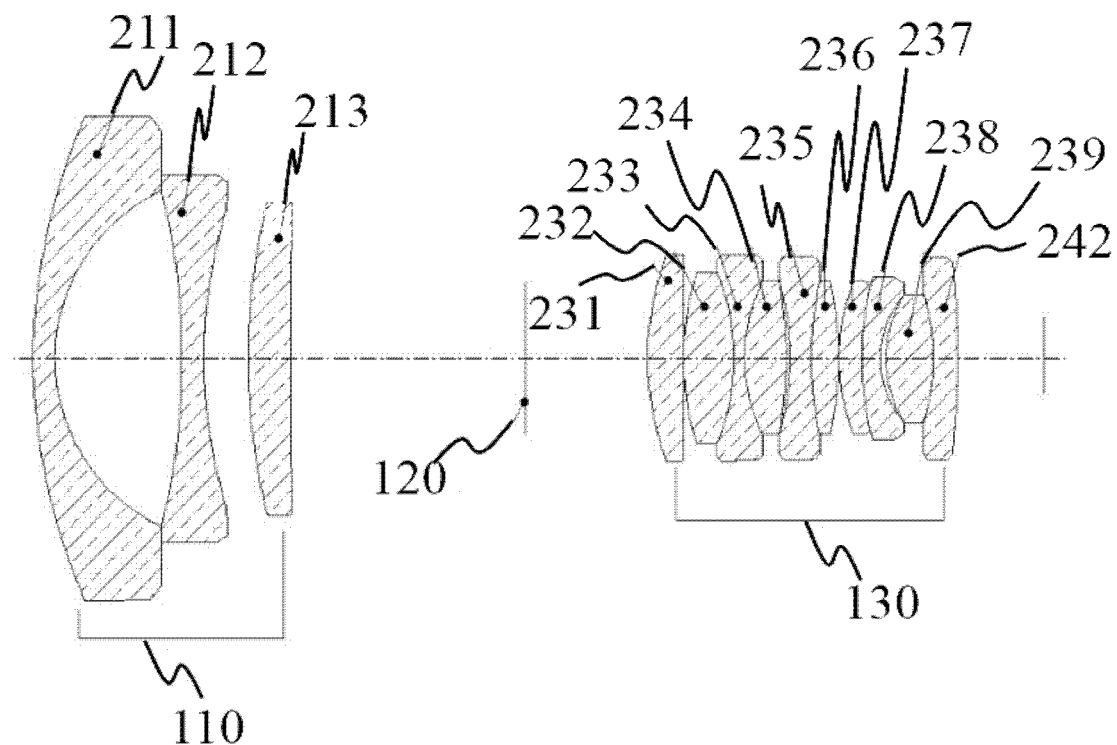

In some embodiments, lens element 240 may be a meniscus lens. As illustrated in FIG. 2C, lens element 242 in second lens group 130 may be a meniscus lens having a negative refractive power.

Figure 2D:
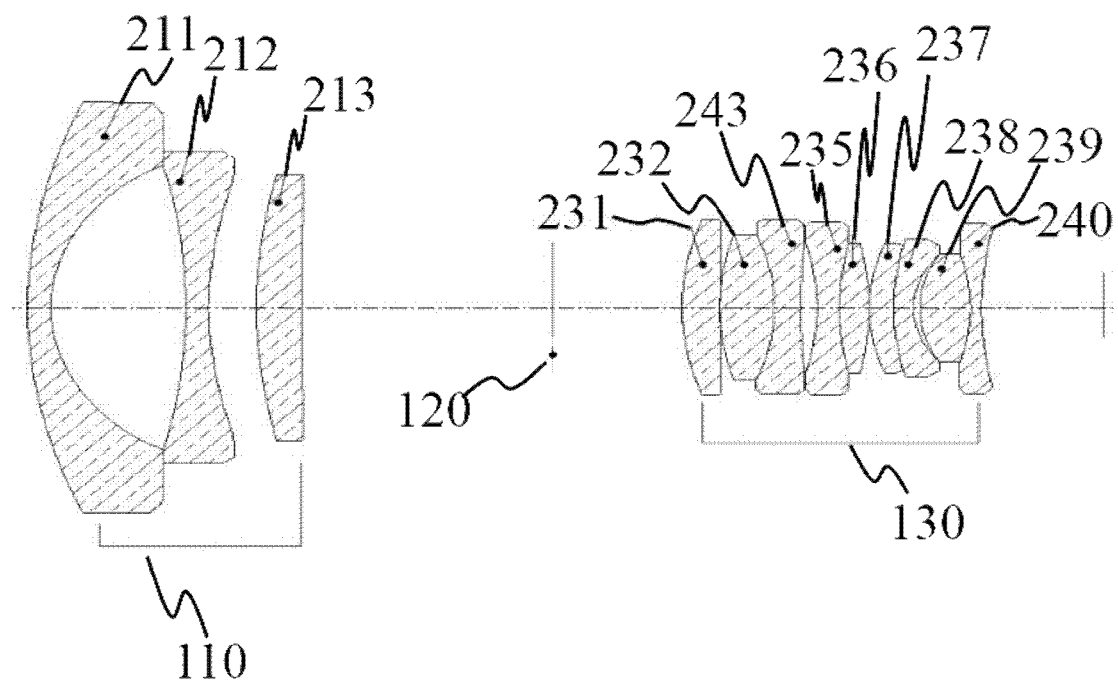

In some embodiments, first lens component may include a biconcave lens. As illustrated in FIG. 2D, first lens component 243 in second lens group 130 may be a biconcave lens having a negative refractive power.

Figure 2E:
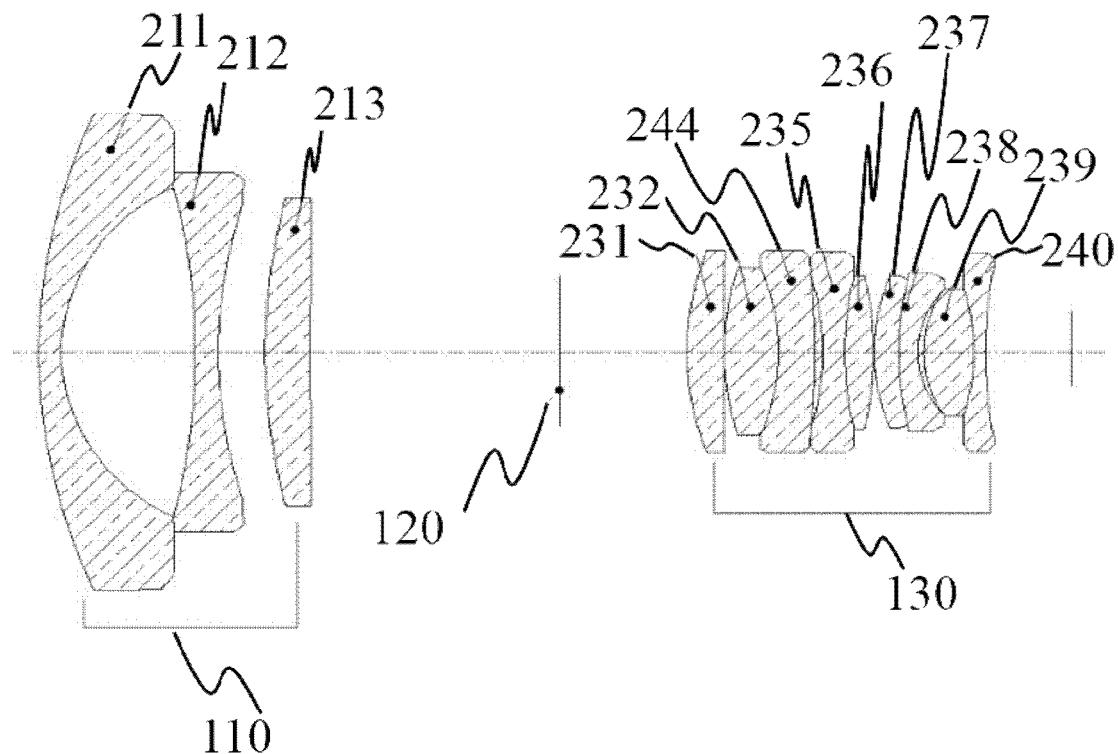

In some embodiments, first lens component may include a meniscus lens. As illustrated in FIG. 2E, first lens component 244 in second lens group 130 may be a meniscus lens having a negative refractive power.

Figure 2F:
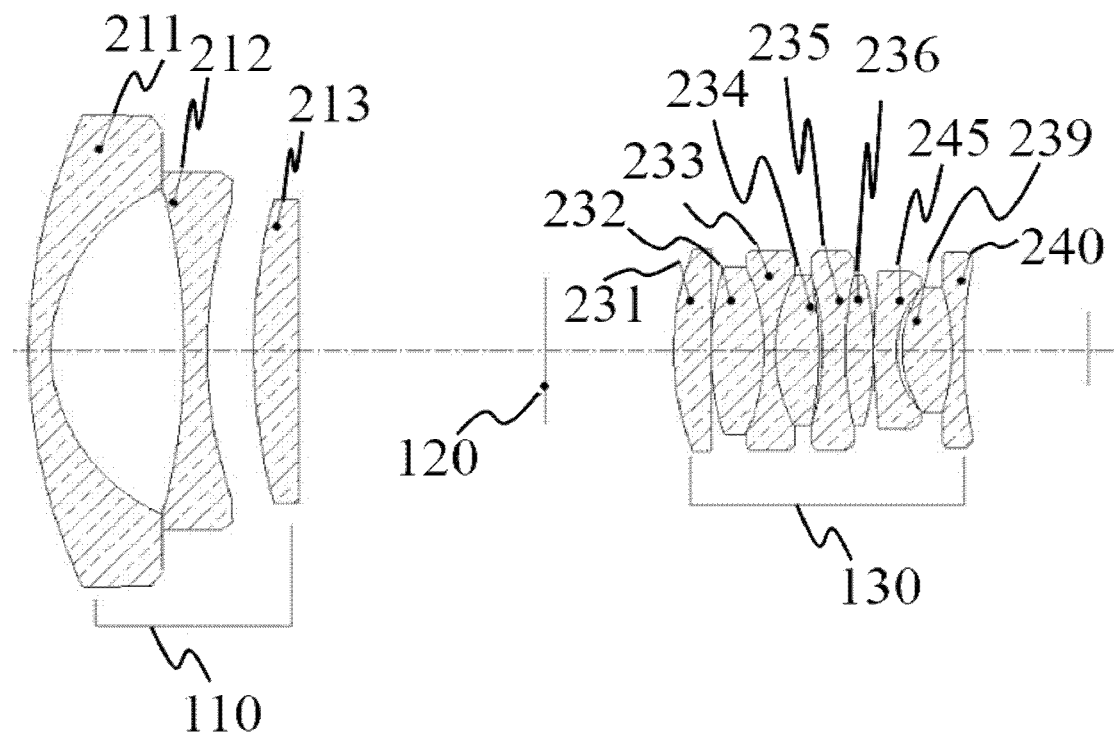

In some embodiments, second lens component may include a meniscus lens. As illustrated in FIG. 2F, second lens component 245 in second lens group 130 may be a meniscus lens having a negative refractive power.

Figure 2G:
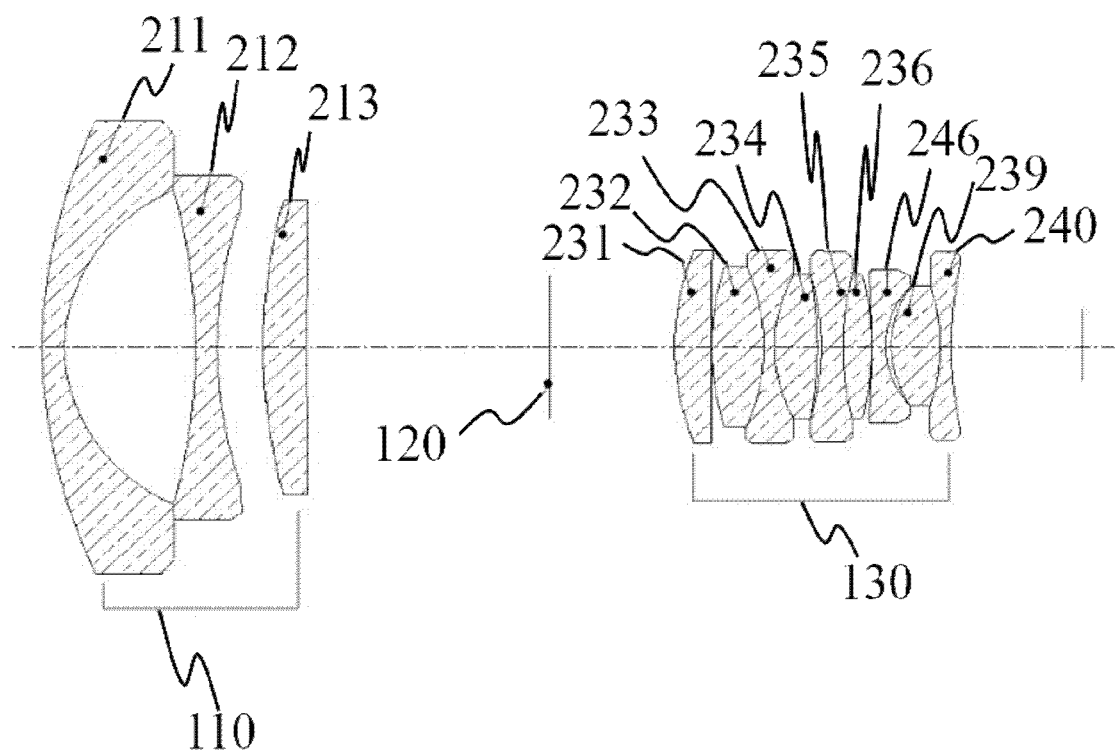

In some embodiments, second lens component may include a biconcave lens. As illustrated in FIG. 2G, second lens component 246 in second lens group 130 may be a biconcave lens having a negative refractive power.

Lens element 231 may converge light rays from aperture stop 120 and reduce coma and astigmatism of zoom lens system 100. The higher refractive index of lens element 231 may have a better convergence effect. For example, the refractive index of lens element 231 may be no less than 1.7.

In some embodiments, lens element 232 and the first component may be affixed to each other by adhesive (or any suitable materials or method). In some embodiments, lens element 232 and lens element 233 may be rigidly affixed together, and the Abbe number of lens element 232 may be greater than 80.

In some embodiments, lens element 233 and lens element 234 may be affixed to each other by adhesive (or any suitable materials or method). In some embodiments, lens element 235 and lens element 236 may be rigidly affixed together and integrated into one lens component. Preferably, Abbe number of lens element 235 may be greater than 65, and refractive index of lens element 235 may be less than 1.55.

Lens element 237 and lens element 238 in the second component may be two meniscus lenses. The meniscus lens (e.g., one side is convex and the other side is concave) can reduce spherical aberration. In some embodiments, lens element 237 and lens element 238 may be affixed to each other by adhesive (or any suitable materials or method). Preferably, the convex surfaces of lens elements 237 and 238 may face towards the object.

In some embodiments, lens element 239 and lens element 240 may be affixed to each other by adhesive (or any suitable materials or method). For example. Abbe number of lens element 239 may be greater than that of lens element 240, and refractive index of lens element 239 may be less than that of lens element 240. As another example, Abbe number of lens element 239 may be greater than 80.

In some embodiments, positions of first lens group 110 and second lens group 130 may change in zoom lens system 100. Zooming may be carried out by varying a distance between first lens group 110 and second lens group 130. The distance between first lens 110 group and second lens group 130 may be not fixed.

Preferably, the following equation (1) is satisfied:

$$1.85 \leq |f_1|/(f_w \times f_t)^{1/2} \leq 2.25, \quad (1)$$

where $f_1$ represents a focus length of first lens group 110, and $f_w$ represents a shortest focus length of zoom lens system 100, and $f_t$ represents a longest focus length of zoom lens system 100. $f_1$ within a reasonable range may reduce aberration and produce a better imaging quality.

Preferably, the following equation (2) is satisfied:

$$0.8 < f_2/f_w < 1.2, \quad (2)$$

where $f_2$ represents a focus length of second lens group 130. $f_2$ within a reasonable range may reduce aberration and produce a better imaging quality.

Preferably, the following equation (3) is satisfied:

$$0.4 < N_n \times f_w/f_t < 0.55. \quad (3)$$

where $N_n$ represents average refractive index of lens elements 211 and 213. $N_n$ within a certain range may limit divergence of light rays and produce a better imaging quality.

Merely by way of example, zoom lens system 100 may be configured according to parameters of each lens listed in Table 1. $R_1$ represents radius of curvature of the surface towards the object. $R_2$ represents radius of curvature of the surface towards image plane 350. $T_c$ represents thickness of an optical center of the lens. $N_d$ represents refraction index of the lens. $V_d$ represents Abbe number of the lens.

In some embodiments, the parameters of each lens may be within a certain range. The certain range satisfying conditions listed in Table 1 may allow zoom lens system 100 to achieve a better imaging quality and a higher resolution.

In some embodiments, a first distance along the optical axis between the optical centers of lens elements 211 and 212 may be set in a range from 7.5 mm to 10.5 mm. For example, the distance may be set 10 mm. In some embodiments, a second distance along the optical axis between the optical centers of lens elements 212 and 213 may be set in a range from 0.0 mm to 4.0 mm. For example, the distance may be set 2.4 mm. In some embodiments, a third distance along the optical axis between the optical centers of lens elements 231 and 232 may be set in a range from 0.1 mm to 0.5 mm. For example, the distance may be set 0.1 mm. In some embodiments, three lens elements 232, 233 and 234 may be affixed to each other by adhesive (or any suitable materials or method). A fourth distance along the optical axis between the optical centers of the lens elements 234 and 235 may be set in a range from 0.5 mm to 1.5 mm. For example, the distance may be set 0.7 mm. Two lens elements 235 and 236 may be rigidly affixed to each other and integrated into one lens component. In some embodiments, a fifth distance along the optical axis between the optical centers of lens elements 236 and 237 may be set in a range from 0.1 mm to 0.5 mm. For example, the distance may be set 0.1 mm. Two lens elements 237 and 238 may be rigidly affixed to each other and integrated into one lens component. In some embodiments, a sixth distance along the optical axis between the optical centers of lens elements 238 and 239 may be set in a range from 0.1 mm to 1.0 mm. For example, the distance may be set 0.3 mm. In some embodiments, two lens elements 239 and 240 may be rigidly affixed to each other and integrated into one lens component.

TABLE 2

| Lens element | $R_1$ (mm) | $R_2$ (mm) | $T_c$ (mm) | $N_d$ | $V_d$ |
|---|---|---|---|---|---|
| 211 | 61 | 16 | 1.5 | 1.834 | 37.185 |
| 212 | −37.55 | 22.61 | 1.1 | 1.697 | 55.534 |
| 213 | 30.4 | −217.9 | 4.35 | 1.847 | 23.791 |
| 231 | 34.28 | −95 | 2 | 1.883 | 40.807 |
| 232 | 11.1 | −17.557 | 3.84 | 1.497 | 81.61 |
| 233 | −17.557 | 11.328 | 0.7 | 1.717 | 29.51 |
| 234 | 11.328 | −72.199 | 2.53 | 1.497 | 81.595 |
| 235 | −15.103 | 34.055 | 0.7 | 1.487 | 70.42 |
| 236 | 34.055 | −17.04 | 2.17 | 1.847 | 23.791 |
| 237 | 22.518 | 172.6 | 1.59 | 1.883 | 40.807 |
| 238 | 172.6 | 7.45 | 0.7 | 1.575 | 41.507 |

TABLE 1

| Lens element | $R_1$ (mm) | $R_2$ (mm) | $T_c$ (mm) | $N_d$ | $V_d$ |
|---|---|---|---|---|---|
| 211 | $30 \leq R_1 \leq 100$ | $12 \leq R_2 \leq 18$ | $0.8 \leq T_c \leq 2$ | $1.75 \leq N_d \leq 1.89$ | $40 \leq V_d \leq 50$ |
| 212 | $-45 \leq R_1 \leq -34$ | $18 \leq R_2 \leq 30$ | $0.8 \leq T_c \leq 2$ | $1.6 \leq N_d \leq 1.76$ | $50 \leq V_d \leq 62$ |
| 213 | $25 \leq R_1 \leq 35$ | $200 \leq R_2$ | $3 \leq T_c \leq 5$ | $1.7 \leq N_d \leq 1.95$ | $17 \leq V_d \leq 30$ |
| 231 | $21 \leq R_1 \leq 35$ | $-200 \leq R_2 \leq -50$ | $1.8 \leq T_c \leq 3.8$ | $1.7 \leq N_d \leq 1.95$ | $20 < V_d < 42$ |
| 232 | $8 \leq R_1 \leq 20$ | $-30 \leq R_2 \leq -15$ | $3 \leq T_c \leq 5$ | $1.4 \leq N_d \leq 1.5$ | $70 \leq V_d \leq 96$ |
| 233 | $-30 \leq R_1 \leq -15$ | $8 \leq R_2 \leq 20$ | $0.6 \leq T_c \leq 2$ | $1.7 \leq N_d \leq 1.95$ | $17 \leq V_d \leq 30$ |
| 234 | $8 \leq R_1 \leq 20$ | $-75 \leq R_2 \leq -20$ | $2.5 \leq T_c \leq 4.5$ | $1.45 \leq N_d \leq 1.65$ | $60 \leq V_d \leq 91$ |
| 235 | $-20 \leq R_1 \leq -8$ | $11 \leq R_2 \leq 35$ | $0.6 \leq T_c \leq 2$ | $1.45 \leq N_d \leq 1.65$ | $60 \leq V_d \leq 82$ |
| 236 | $11 \leq R_1 \leq 35$ | $-21 \leq R_2 \leq -14$ | $2 \leq T_c \leq 3.5$ | $1.7 \leq N_d \leq 1.95$ | $17 \leq V_d \leq 30$ |
| 237 | $15 \leq R_1 \leq 30$ | $150 \leq R_2$ | $1 \leq T_c \leq 3$ | $1.8 \leq N_d \leq 1.92$ | $30 \leq V_d \leq 50$ |
| 238 | $150 \leq R_1$ | $6 \leq R_2 \leq 15$ | $0.6 \leq T_c \leq 2$ | $1.55 \leq N_d \leq 1.75$ | $25 \leq V_d \leq 45$ |
| 239 | $7 \leq R_1 \leq 15$ | $-15 \leq R_2 \leq -7$ | $2.5 \leq T_c \leq 4.5$ | $1.4 \leq N_d \leq 1.5$ | $70 \leq V_d \leq 96$ |
| 240 | $-15 \leq R_1 \leq -7$ | $150 \leq R_2$ | $0.6 \leq T_c \leq 2$ | $1.7 \leq N_d \leq 1.85$ | $35 \leq V_d \leq 50$ |

TABLE 2-continued

| Lens element | $R_1$ (mm) | $R_2$ (mm) | $T_c$ (mm) | $N_d$ | $V_d$ |
|---|---|---|---|---|---|
| 239 | 8.6 | −8.6 | 3.48 | 1.497 | 81.61 |
| 240 | −8.6 | 234.9 | 0.7 | 1.782 | 37.095 |

Zoom lens system 100 with parameters of each lens listed in Table 2 may have optical indexes as following. The total length of optical may be less than or equal to 95.7 mm. The focus length may be in the range of 3.7 to 16 mm. The image surface may be 1/1.7". Aperture stop 120 may be in the range of 1.5 to 2.6.

In some embodiments, the first distance along the optical axis between the optical centers of lens elements 211 and 212 may be set 10 mm. The second distance along the optical axis between the optical centers of lens elements 212 and 213 may be 2.4 mm. The third distance along the optical axis between the optical centers of lens elements 231 and 232 may be set 0.1 mm. The fourth distance along the optical axis between the optical centers of lens elements 234 and 235 may be set 0.7 mm. The fifth distance along the optical axis between the optical centers of lens elements 236 and 237 may be set 0.1 mm. The sixth distance along the optical axis between the optical centers of lens elements 238 and 239 may be set 0.3 mm.

Figure 3:
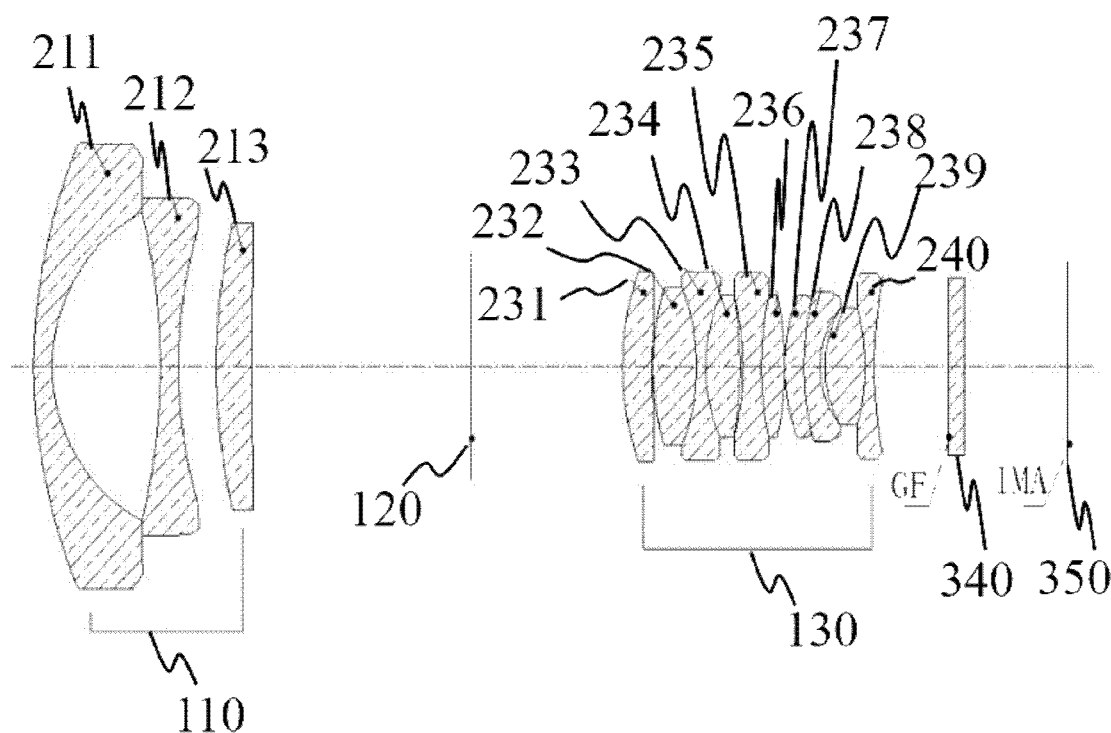
FIG. 3 illustrates an exemplary optical imaging device including an exemplary zoom lens system configuration according to some embodiments of the present disclosure.

FIG. 3 illustrates an exemplary zoom lens system 100 configuration of an optical imaging device according to some embodiments of the present disclosure. Zoom lens system 100, in order from the object, a first lens group 110, an aperture stop 120, a second lens group 130, a glass filter (GF) 340 and an image plane (IMA) 350.

It should be noted that the above description about lens is merely an example, should not be understood as the only embodiment. Obviously, to those skilled in the art, after understanding the basic principles of the connection between different devices, the devices and connection between the devices may be modified or varied without departing from the principles. The modifications and variations are still within the scope of the current disclosure described above. For example, second lens group 130 may have the configurations depicted in FIGS. 2B-2G.

Figure 4A:
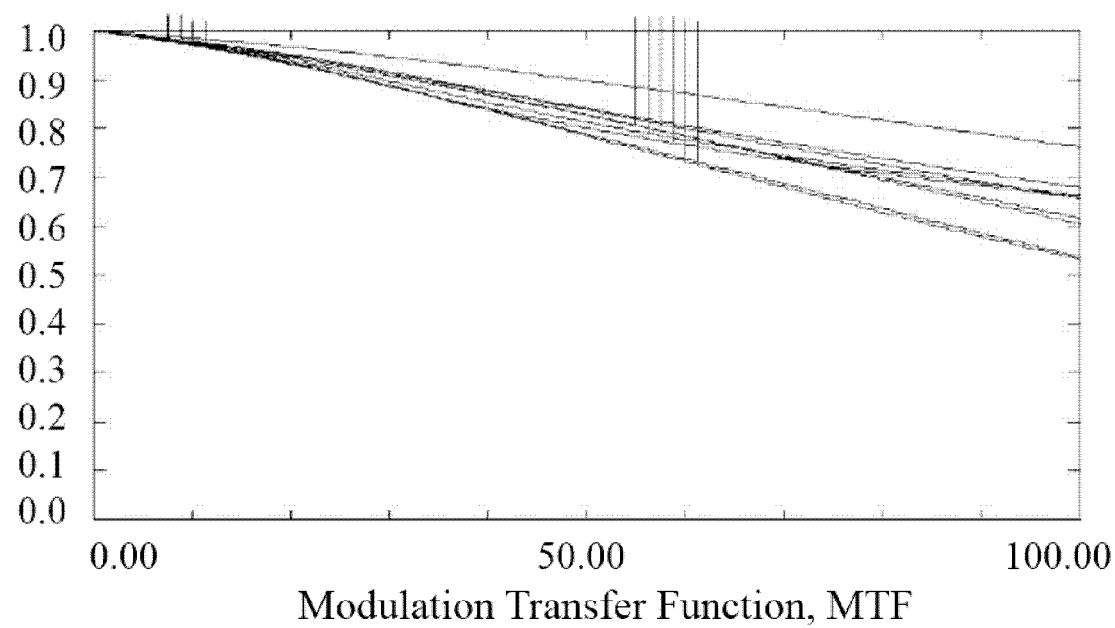
FIGS. 4A through 4V illustrate optical simulation of the zoom lens system illustrated in FIG. 2A according to some embodiments of the present disclosure.
Figure 4B:
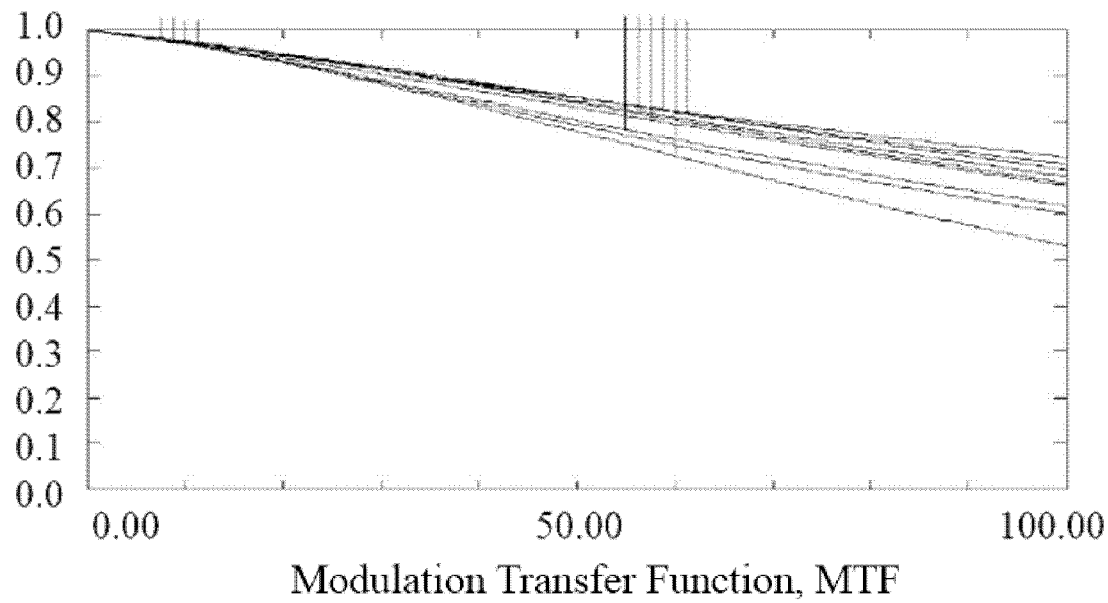
Figure 4C:
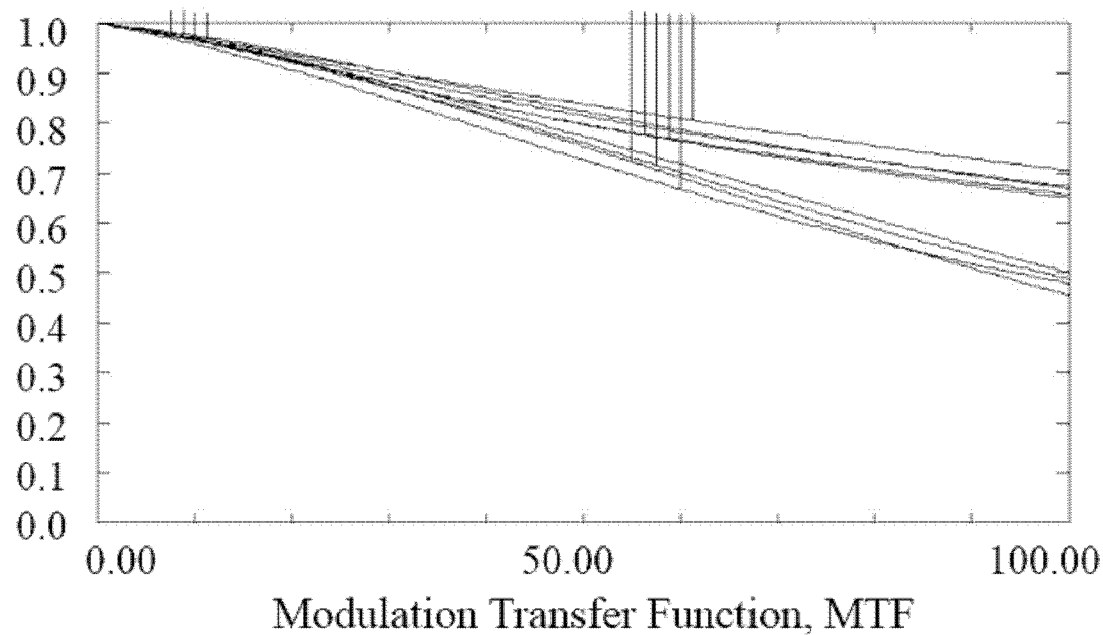
Figure 4D:
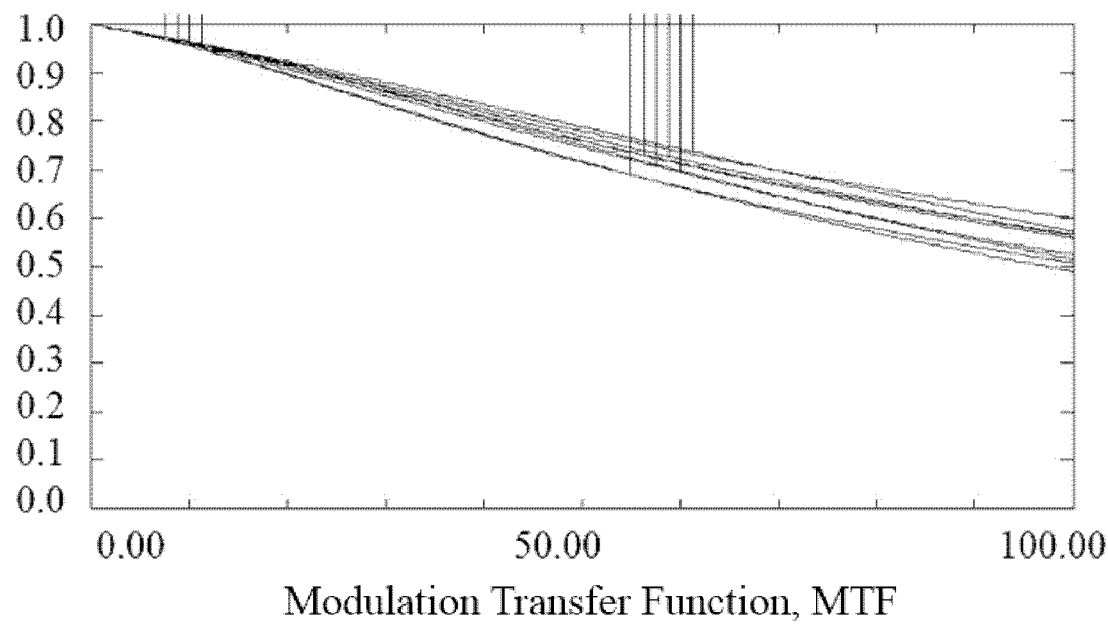
Figure 4E:
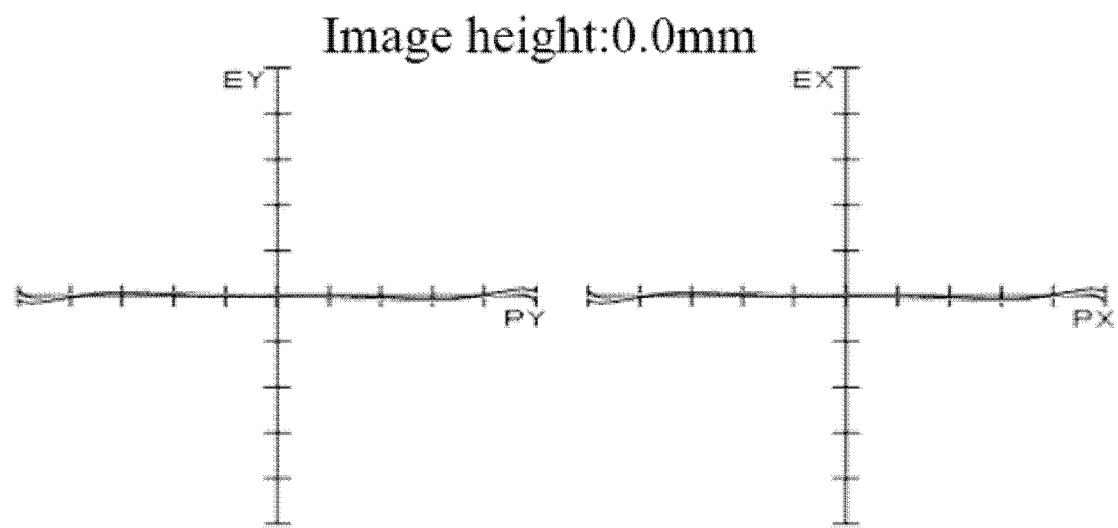
Figure 4F:
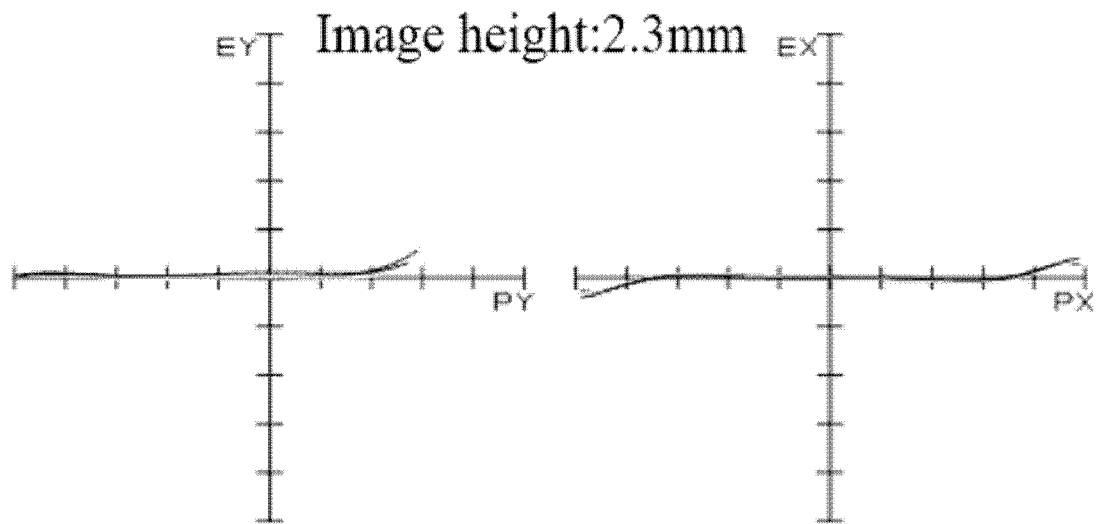
Figure 4G:
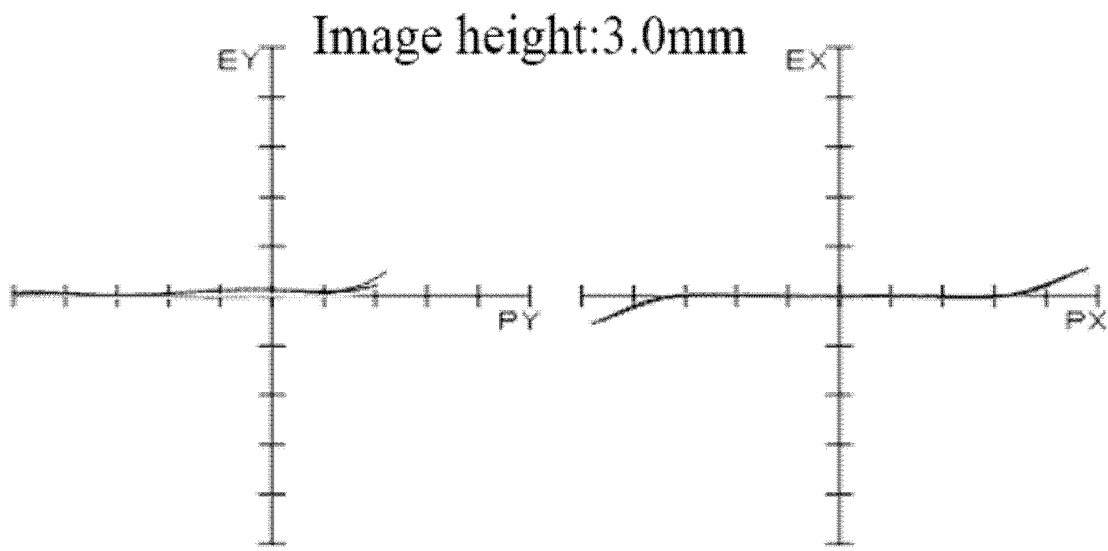
Figure 4H:
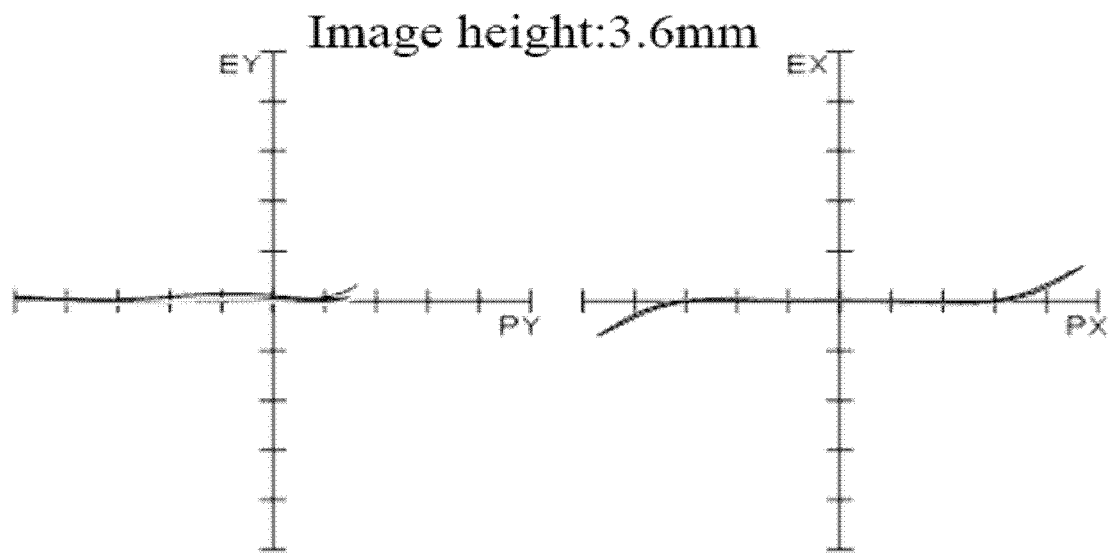
Figure 4I:
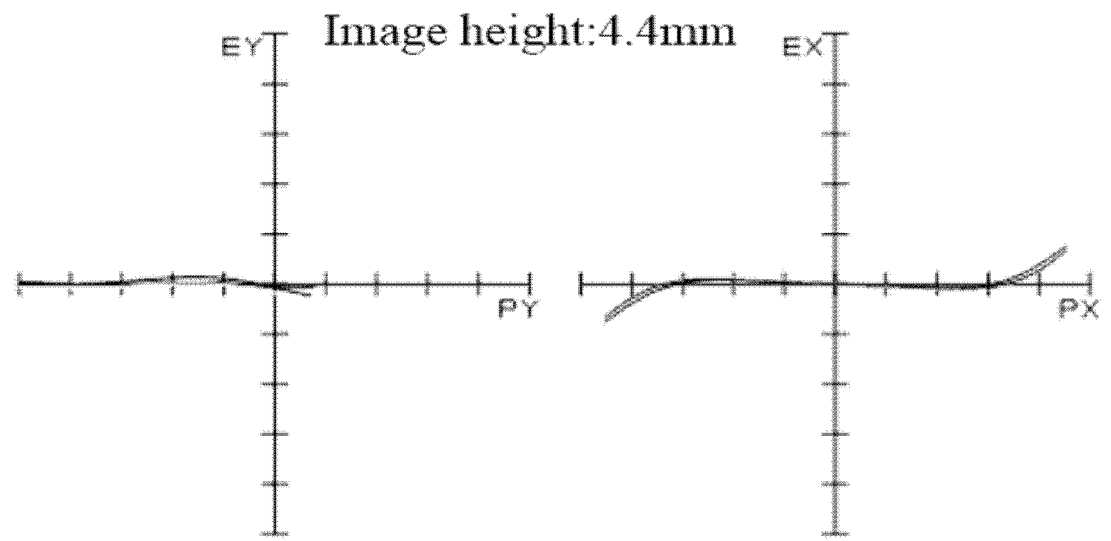
Figure 4J:
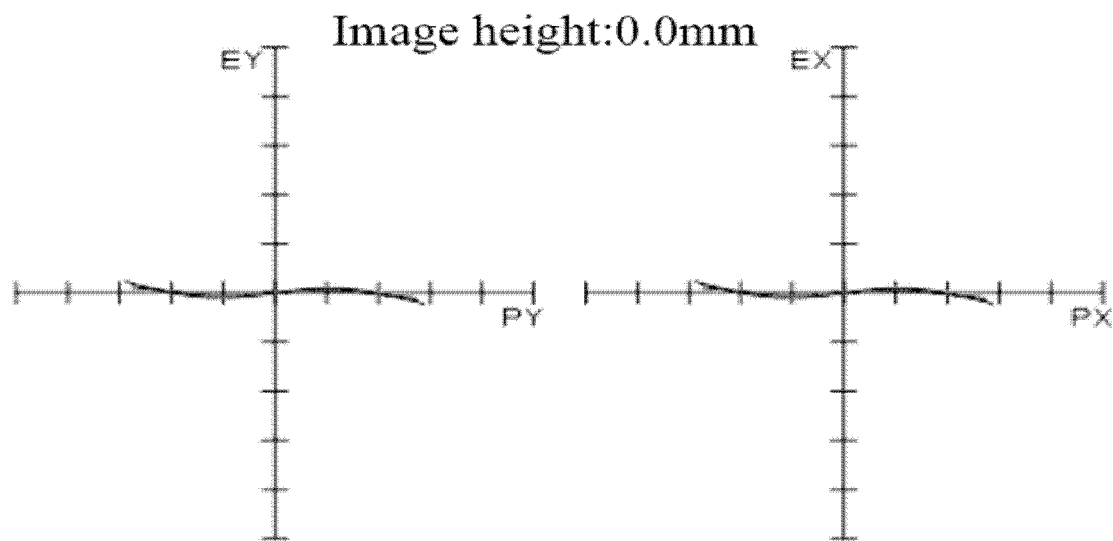
Figure 4K:
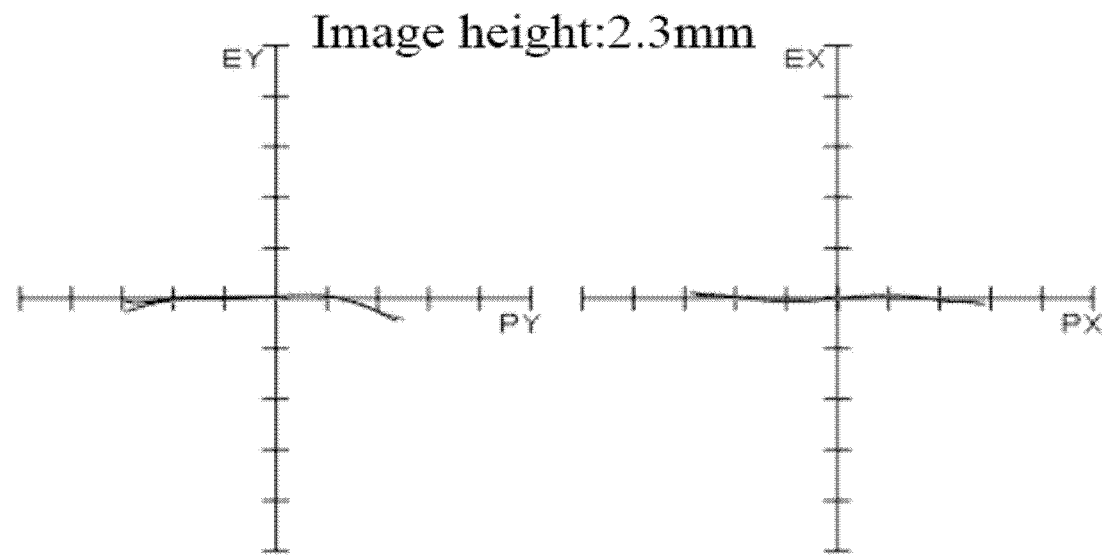
Figure 4L:
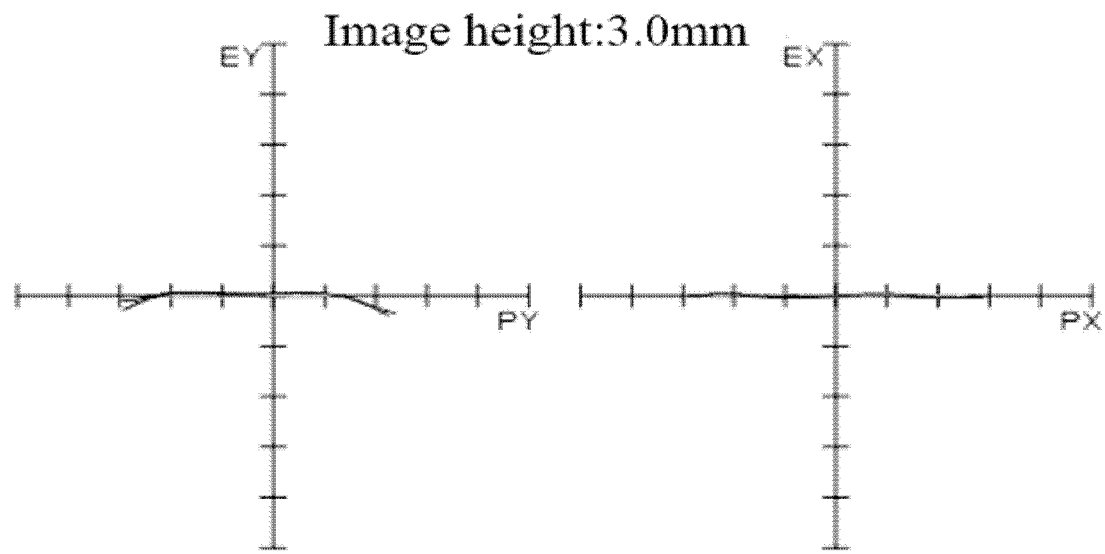
Figure 4M:
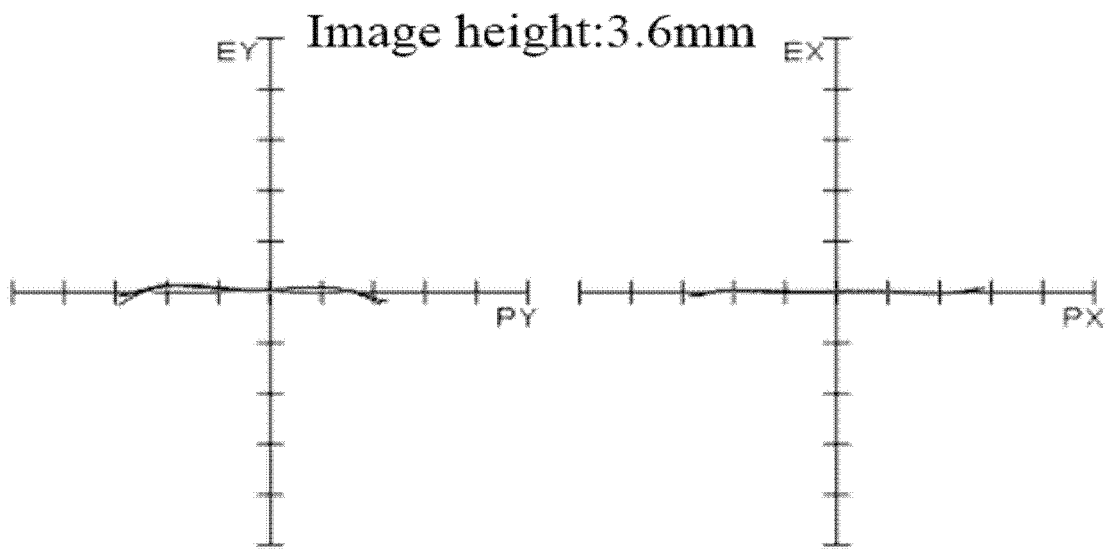
Figure 4N:
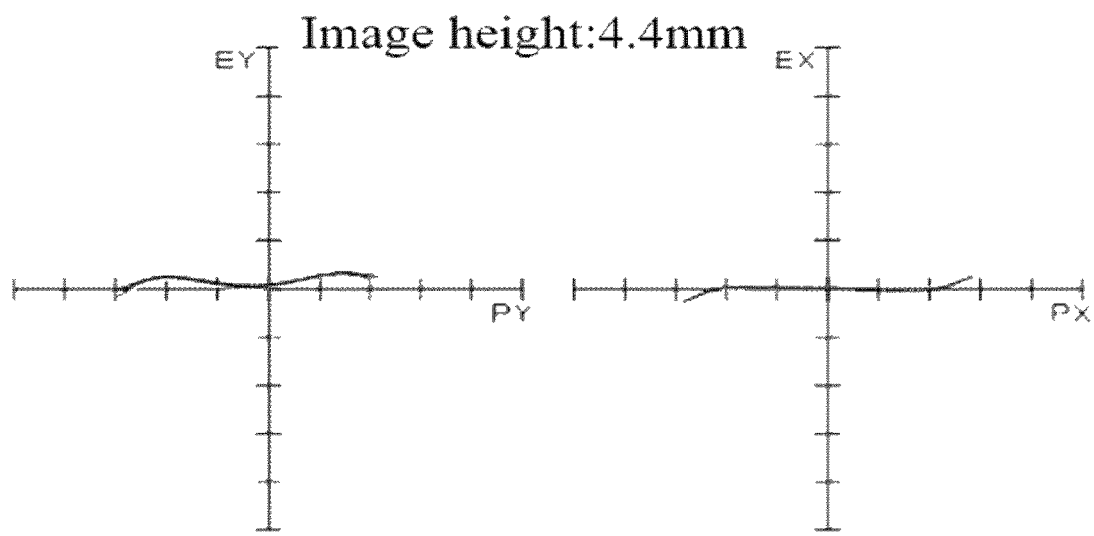
Figure 4O:
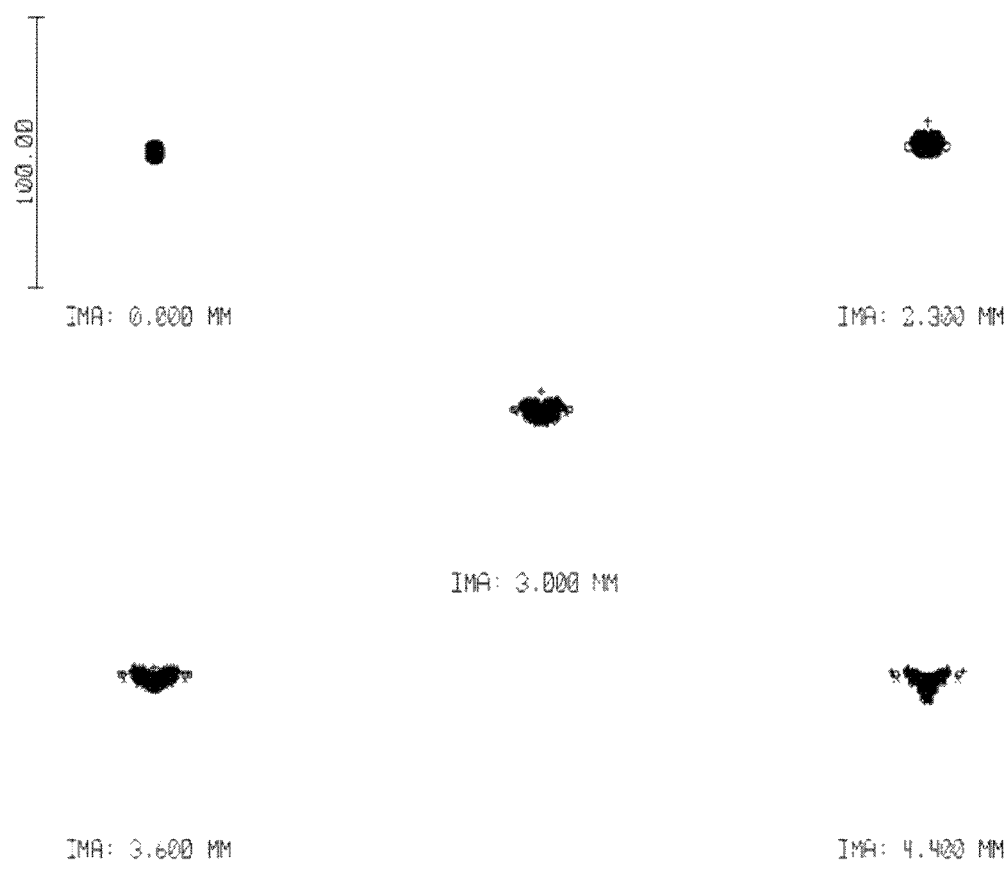
Figure 4P:
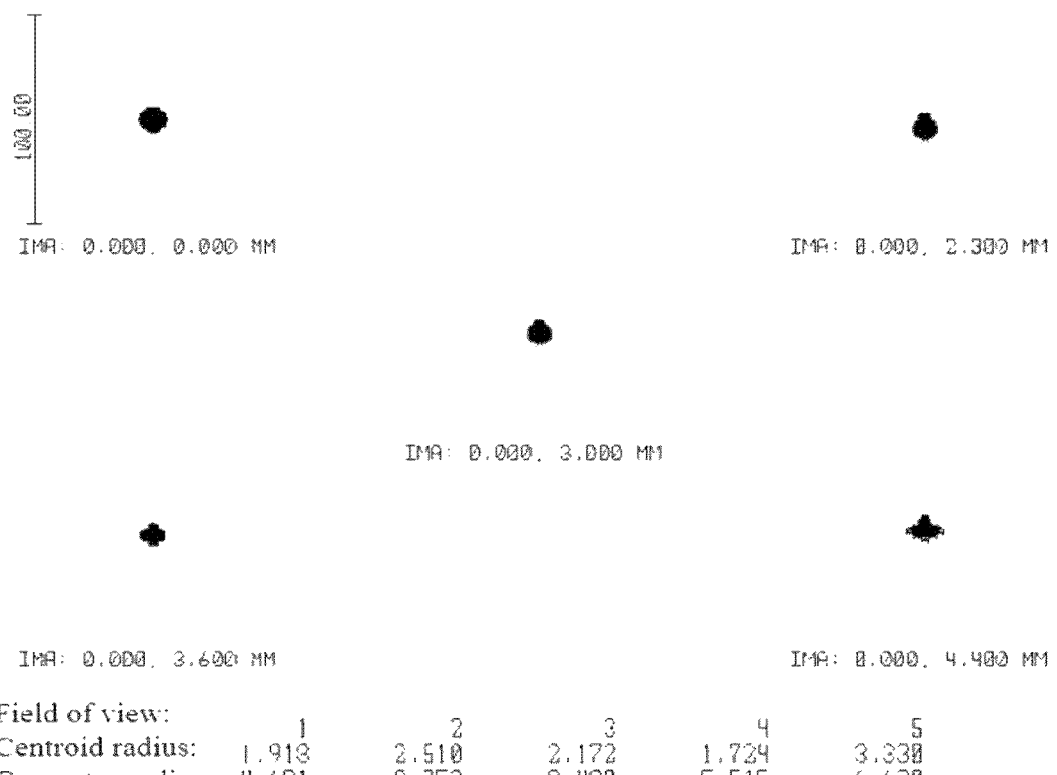
Figure 4Q:
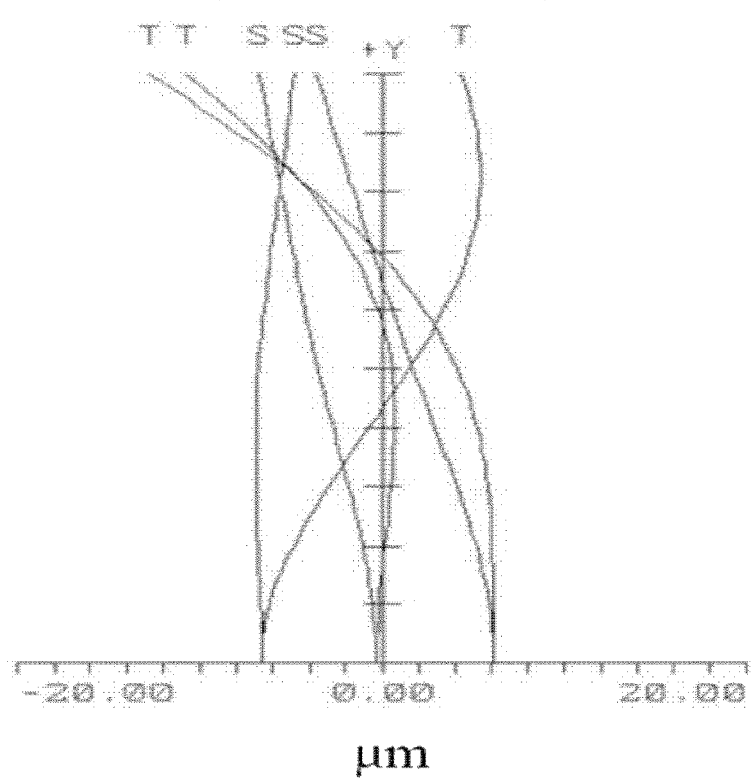
Figure 4R:
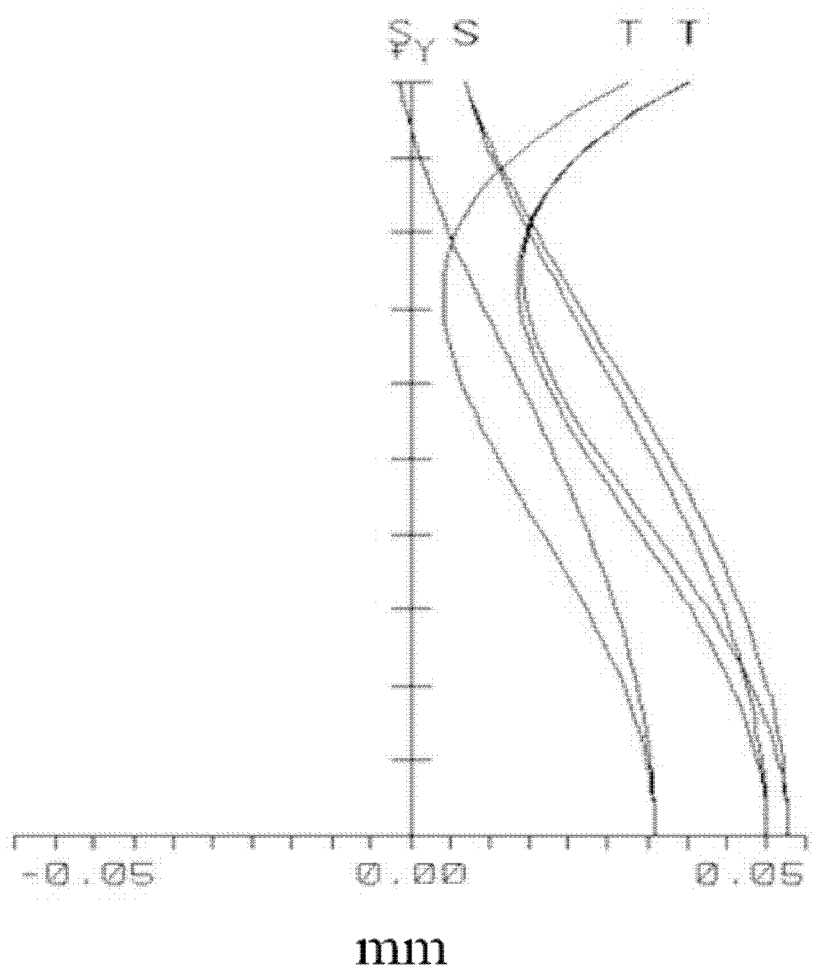
Figure 4S:
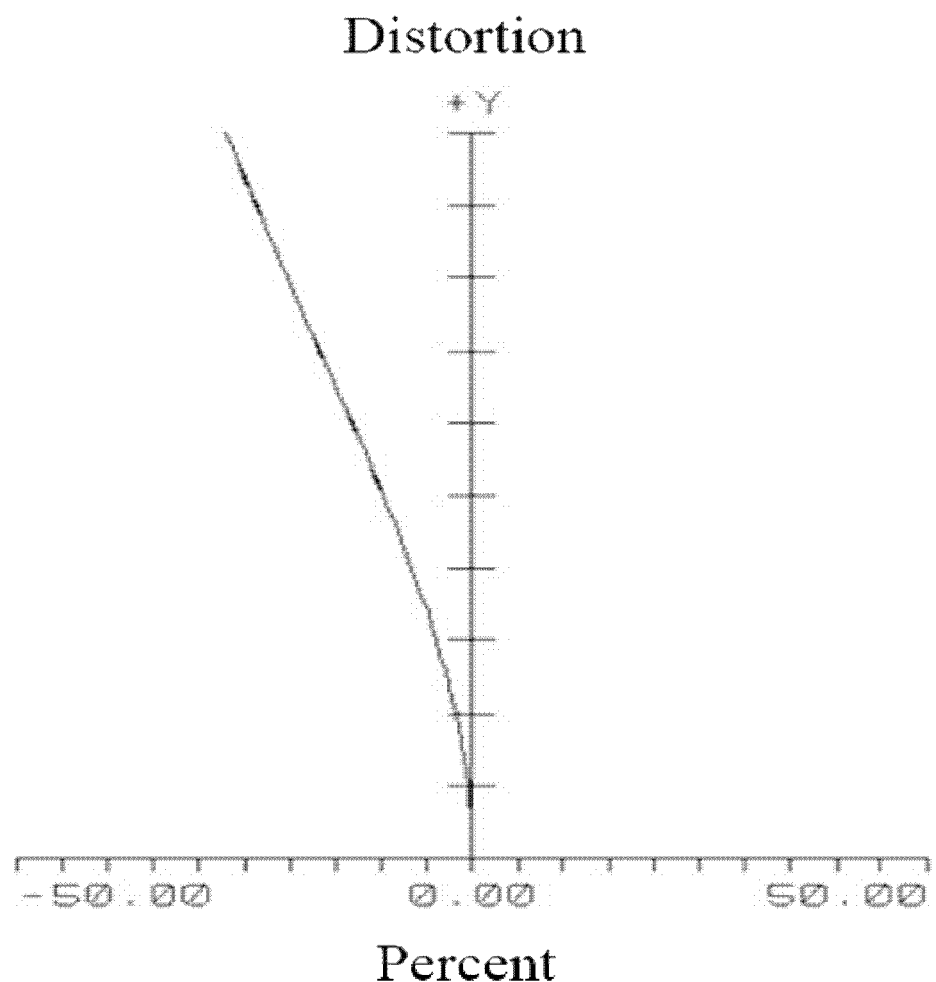
Figure 4T:
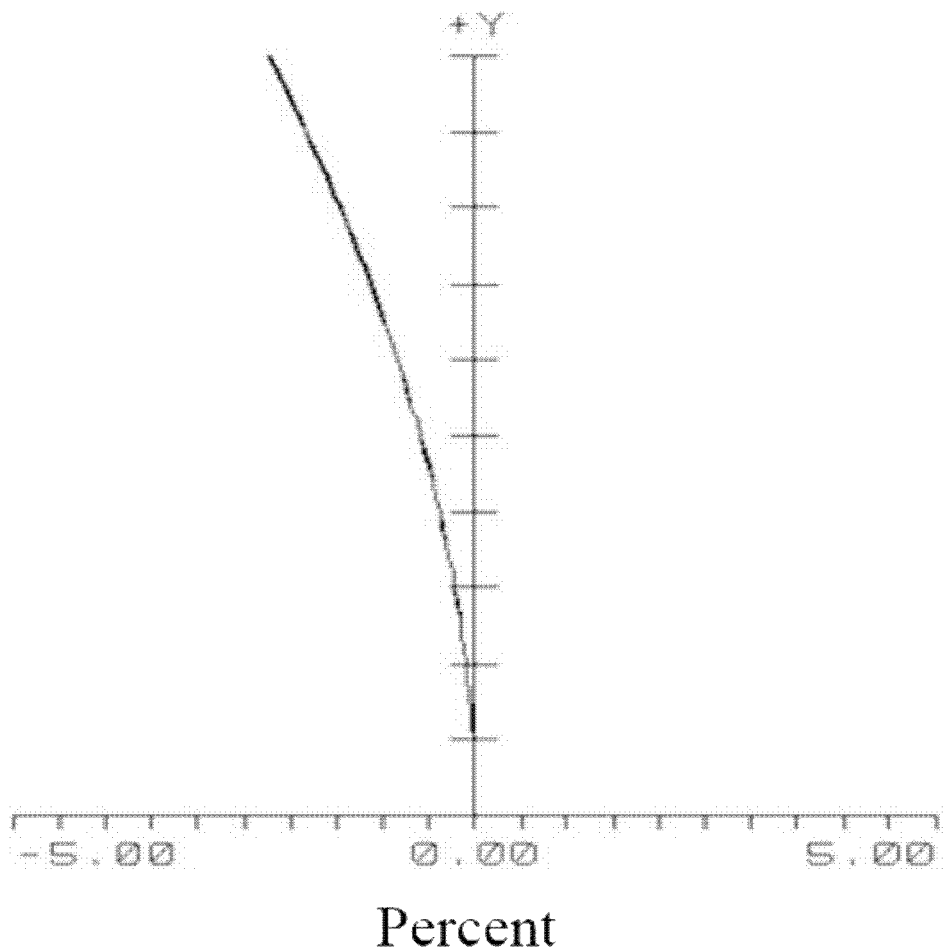
Figure 4U:
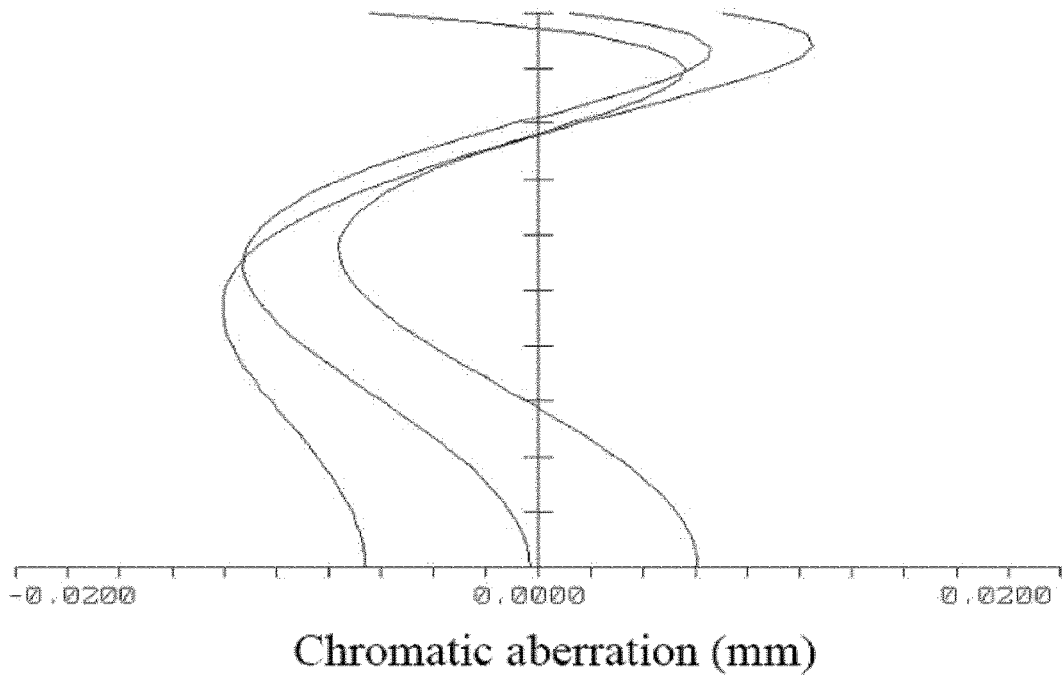
Figure 4V:
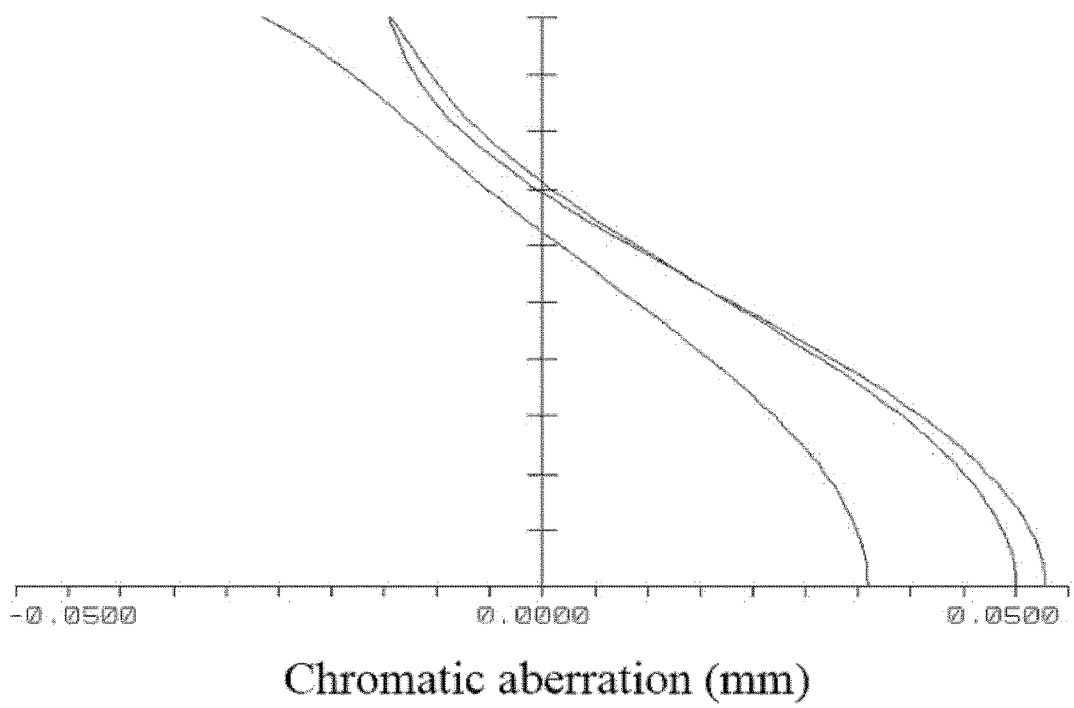

FIGS. 4A through 4V illustrate optical simulation of the zoom lens system illustrated in FIG. 2A according to some embodiments of the present disclosure. FIGS. 4A and 4B show Modulation Transfer Function (MTF) performances of zoom lens system 100 illustrated in FIG. 2A in short focus and long focus, respectively. As shown in FIGS. 4A and 4B, the MTF curves are smooth, and the average value is greater than 0.64. The MTF curves may indicate that zoom lens system 100 may satisfy the resolution requirement of the imaging of a 12 million pixel and a 4K camera. FIGS. 4C and 4D show the Modulation Transfer Function (MTF) performance of zoom lens system 100 illustrated in FIG. 2A in short focus and long focus with infrared light, respectively. As shown in FIGS. 4C and 4D, the MTF curves are smooth and the average value is more than 0.55. In some embodiments, the MTF may indicate that zoom lens system may have high resolution and optical performance with infrared light.

FIGS. 4E-4I are respectively transverse ray fan plots of images at different fields of zoom lens system illustrated in FIG. 2A in short focus (i.e., FIG. 4E at a field being 0 mm; FIG. 4F at a field being 2.3 mm, FIG. 4G at a field being 3.0 mm, FIG. 4H at a field being 3.6 mm, and FIG. 4I at a field being 4.4 mm). FIGS. 4J-4N are respectively transverse ray fan plots of images at different fields of zoom lens system illustrated in FIG. 2A at long focus (i.e., FIG. 4J at a field being 0 mm, FIG. 4K at a field being 2.3 mm, FIG. 4L at a field being 3.0 mm, FIG. 4M at a field being 3.6 mm, and FIG. 4N at a field being 4.4 mm). In some embodiments, a coordinate of a horizontal axis refers a position where a light ray passes through aperture stop 120, and a vertical axis refers to a distance between a position where the light ray forming an image on an image plane and a position where a chief ray forming an image on image plane 350. As shown in FIGS. 4E-4N, the aberration curves of the zoom lens system illustrated in FIG. 2A in short focus and long focus close to the horizontal axis. The aberration curves may indicate that the zoom lens system 100 may have a good imaging quality in the range of focus length.

FIGS. 4O and 4P are spots diagrams of zoom lens system illustrated in FIG. 2A in short focus and long focus, respectively. As shown in FIGS. 4O and 4P, the smaller the spot radius is, the better the image quality is. For example, the pixel size of 4K camera is 1.85 u m. The size of spots in FIGS. 4O and 4P are all smaller than the double size of the pixel size, and some of the spots have a size smaller than the pixel size. The sizes of spots may indicate that zoom lens system 100 may have a good imaging quality.

FIGS. 4Q and 4R are the field curvature diagrams of zoom lens system 100 illustrated in FIG. 2A in short focus and long focus, respectively. In some embodiments, a horizontal axis may refer to a distance from a focal plane, and a vertical axis may refer to the field of view from 0 to a maximum value. Three curves, S or T in FIGS. 4Q and 4R, represent image aberration of the light with the wavelengths of 460 nm, 550 nm and 620 nm, respectively. S represents data of a sagittal ray, and T represents data of a tangential ray. The smaller the value of tangential curvature of field is, the better the image quality is. FIGS. 4S and 4T are the distortion diagrams of the zoom lens system illustrated in FIG. 2A in short focus and long focus, respectively. In some embodiments, a horizontal axis may refer to a distortion of a specific percentage, and a vertical axis may refer to the field of view from 0 to a maximum value being. The closer the distortion curve approaches the vertical axis, the smaller the distortion of the zoom lens system is. As shown in FIGS. 4Q and 4S, as to the zoom lens system in short focus, the tangential curvature of field value is in the range of 0 to 0.015 mm, sagittal curvature of field value is in the range of 0 to 0.01 mm, and distortion rate is in the range of −27.5% to 0. As shown in FIGS. 4R and 4T, as to the zoom lens system in long focus, the tangential curvature of field value is in the range of 0 to 0.05 mm, sagittal curvature of field value is in the range of 0 to 0.05 mm, and distortion rate is in the range of −2.3% to 0.

FIGS. 4U and 4V are the chromatic aberration diagrams of zoom lens system 100 illustrated in FIG. 2A in short focus and long focus, respectively. The closer the chromatic aberration curve approaches the vertical axis, the smaller the aberration of the zoom lens system is. As shown in FIG. 4U, the chromatic aberration of the zoom lens system in short focus is in the range of −0.02 to +0.02. As shown in FIG. 4V, the chromatic aberration of the zoom lens system in long focus is in the range of −0.05 to +0.05.

Figure 5A:
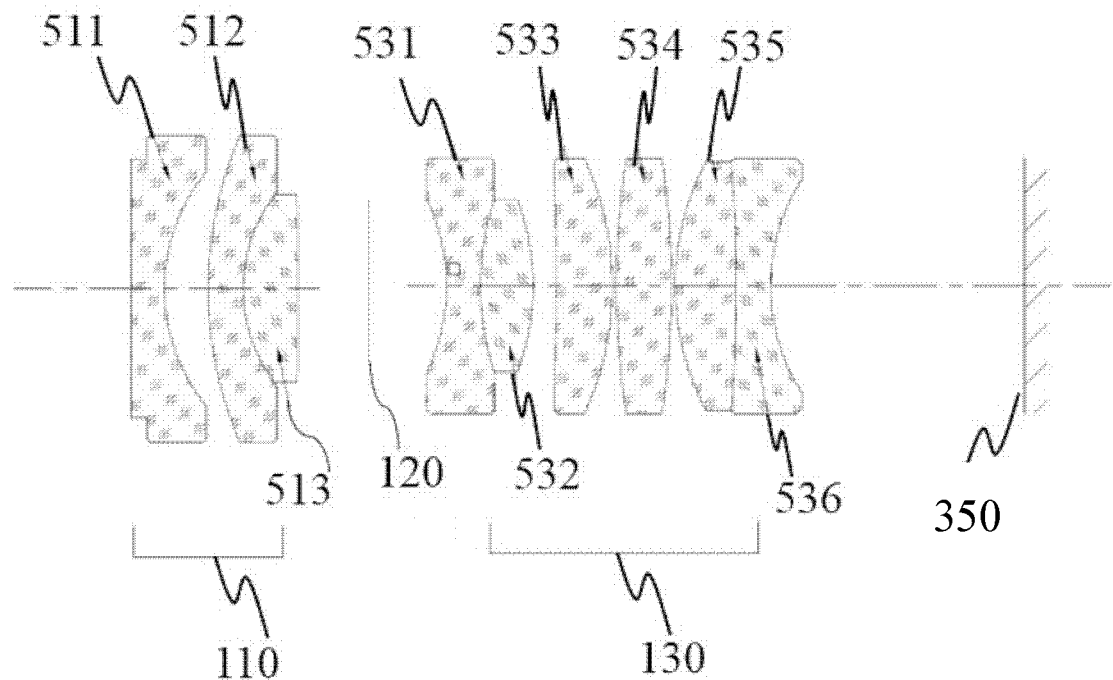
FIG. 5A is a schematic diagram illustrating an exemplary zoom lens system according to some embodiments of the present disclosure.

FIG. 5A is a schematic diagram illustrating an exemplary zoom lens system according to some embodiments of the present disclosure. As shown in FIGS. 1 and 5A, zoom lens system 100 may include a first lens group 110, an aperture stop 120, a second lens group, and other components (not shown). In some embodiments, first lens group 110 may have a negative refractive power, and second lens group 130 may have a positive refractive power. In some embodiments, first lens group 110, aperture stop 120, and second lens group 130 may be configured such that the following conditional expressions are satisfied:

$$0.7 < |F_{eff}/F_L| < 1.7, \text{ and } 0.3 < |F_{eff}/F_{eff}| < 1.2, \quad (4)$$

where $F_{eff}$ represents the effective focal length of the zoom lens system, $F_1$ represents the effective focal length of the first lens group 110, and $F_c$ represents the effective focal length of the second lens group 130.

of the surface towards the object, radius of curvature $R_2$ (in mm) of the surface towards image plane 350, Abbe number $V_d$, refractive index N, and center thickness D (in mm) of a lens. A zoom lens system may be generated based on the lens elements listed in Table 3. In addition, an effective focal length of the zoom lens system may be 8 mm, size of aperture may satisfy F/2.0, and total length of the zoom lens system may be 23.5 mm.

TABLE 3

| Lens element | $R_1$ | $R_2$ | N | $V_d$ | D |
|---|---|---|---|---|---|
| 511 | $R_1 = \infty$ | $5 < R_2 < 10$ | $1.5 < N < 1.7$ | $50 < V_d < 70$ | $0.8 < D < 1.5$ |
| 512 | $10 < R_1 < 15$ | $4 < R_2 < 8$ | $1.5 < N < 1.7$ | $50 < V_d < 70$ | $0.8 < D < 1.5$ |
| 513 | $4 < R_1 < 8$ | $400 < R_2 < 600$ | $1.7 < N < 1.9$ | $30 < V_d < 50$ | $1.3 < D < 1.8$ |
| 531 | $5 < R_1 < 10$ | $5 < R_2 < 10$ | $1.7 < N < 1.9$ | $20 < V_d < 40$ | $0.8 < D < 1.5$ |
| 532 | $5 < R_1 < 10$ | $5 < R_2 < 10$ | $1.5 < N < 1.7$ | $50 < V_d < 70$ | $1.2 < D < 1.9$ |
| 533 | $90 < R_1 < 150$ | $5 < R_2 < 10$ | $1.5 < N < 1.7$ | $50 < V_d < 70$ | $1.2 < D < 1.9$ |
| 534 | $20 < R_1 < 30$ | $20 < R_2 < 30$ | $1.5 < N < 1.7$ | $50 < V_d < 70$ | $1.1 < D < 1.8$ |
| 535 | $5 < R_1 < 10$ | $40 < R_2 < 60$ | $1.5 < N < 1.7$ | $50 < V_d < 70$ | $1.5 < D < 2.2$ |
| 536 | $40 < R_1 < 60$ | $5 < R_2 < 10$ | $1.5 < N < 1.7$ | $50 < V_d < 70$ | $0.8 < D < 1.5$ |

In some embodiments, first lens group 110 having a negative refractive power may include one or more lens elements. For example, as illustrated in FIG. 5A, first lens group 110 may include a first lens element 511, a second lens element 512, and a third lens element 513. Second lens group 130 having a positive refractive power may include one or more lens elements. For example, as illustrated in FIG. 5A, second lens group 130 may include a fourth lens element 531, a fifth lens element 532, a sixth lens element 533, a seventh lens element 534, an eighth lens element 535, and a ninth lens element 536. The lens elements above may be an individual lens having different properties than other lens elements (e.g., shape, size (e.g., height and width, etc.), refractive power, effective focal length, Abbe number of the lens elements, or the like, or any combination thereof).

The lens elements 511-513 and 531-536 may have different refractive powers. In some embodiments, first lens element 511, second lens element 512, and third lens element 513 may have a negative refractive power, a negative refractive power, and a positive refractive power, respectively. In some embodiments, fourth lens element 531, fifth lens element 532, sixth lens element 533, seventh lens element 534, eighth lens element 535, and ninth lens element 536 may have a negative refractive power, a positive refractive power, a positive refractive power, a positive refractive power, a positive refractive power, and a negative refractive power, respectively.

The lens elements 511-513 and 531-536 may have different configurations. In some embodiments, first lens element 511 may be a plano-concave lens with a convex surface towards image plane 350, second lens element 512 may be a meniscus lens with a convex surface towards an object (i.e., the opposite direction to image plane 350), and the third lens element 513 may be a meniscus lens with a convex surface towards the object. In some embodiments, fourth lens element 531 may be a biconcave lens, fifth lens element 532 may be a biconvex lens, sixth lens element 533 may be a meniscus lens with a convex surface towards image plane 350, seventh lens element 534 may be a biconvex lens, eighth lens element 535 may be a biconvex lens, ninth lens element 536 may be a biconcave lens. In some other embodiments, the configurations of the lens elements (e.g., in order from the object) may further satisfy conditions listed in Table 3. Table 3 lists radius of curvature $R_1$ (in mm)

In some embodiments, two lens elements may be affixed to each other by an adhesive (or any suitable materials or method). In some embodiments, two lens elements may be rigidly affixed to each other and integrated into one lens component. For example, first lens element 511 may be affixed to second lens element 512 by an adhesive (e.g., glue, UV-curing adhesive, etc.), and integrated into a first lens component. In some embodiments, first lens element 511 may be a plano-concave lens, and second lens element 512 may be a meniscus lens. The first lens component, including first lens element 511 and second lens element 512 may have a positive refractive power. As another example, fourth lens element 531 and fifth lens element 532 may be affixed to each other and integrated into a second lens component. In some embodiments, fourth lens element 531 may be a biconcave lens, and fifth lens element 532 may be a biconvex lens. The second lens component, including fourth lens element 531 and fifth lens element 532 may have a negative refractive power. As another example, eighth lens element 535 and ninth lens element 536 may be affixed to each other and integrated into a third lens component. In some embodiments, eighth lens element 535 may be a biconvex lens, and ninth lens element 532 may be a biconvex lens. The third lens component, including eighth lens element 535 and ninth lens element 532 may have a positive refractive power.

Figure 5B:
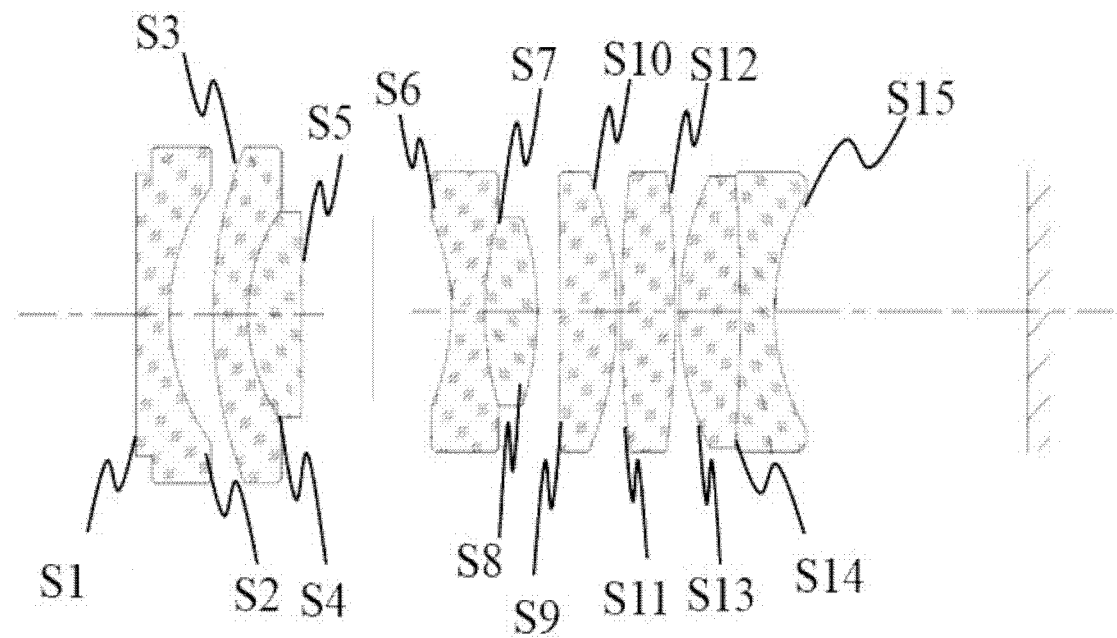
FIG. 5B is a schematic diagram illustrating lens surfaces of the zoom lens system illustrated in FIG. 5A according to some embodiments of the present disclosure.

FIG. 5B is a schematic diagram illustrating lens surfaces of the zoom lens system illustrated in FIG. 5A according to some embodiments of the present disclosure. Referring to FIGS. 1, and 5A, zoom lens system 100 may include first lens group 110, aperture stop 120, and second lens group 130. In some embodiments, as illustrated in FIG. 5B, zoom lens system 100 may include 15 lens surfaces (arranged from S1 to S15). First lens element 511 may include lens surface S1 and lens surface S2. Second lens element 512 (which may have lens surface S3) and third lens element 513 may be affixed to each other to form the first lens component. Lens surface S4 may be a surface between the second lens element 512 and the third lens element 513. Lens surface S5 may be a surface of third lens element 513 towards the image plane 350. Fourth lens element 531 (which may have lens surface S6) and fifth lens element 532 may be affixed to each other to form the second lens component. Lens surface S7 may be a surface between fourth lens element 531 and fifth lens element 532. Lens surface S8 may be a surface of fifth lens element 532 towards the image plane 350. Sixth lens element 533 may have lens surface S9 (towards the object) and lens surface S10 (towards the image plane 350). Seventh lens element 534 may have lens surface S11 (towards the object) and lens surface S12 (towards the image plane 350). Eighth lens element 535 (which may have lens surface S13) and ninth lens element 536 may be affixed to form the third lens component. Lens surface S14 may be a surface between eighth lens element 535 and ninth lens element 536. Lens surface S15 may be a surface of the ninth lens element towards the image plane 350.

Merely by way of example, zoom lens system 100 may be configured according to the parameters listed in Table 4. In addition, an effective focal length of the zoom lens system may be 8 mm, size of aperture may satisfy F/2.0, and total length of the zoom lens system may be 23.5 mm.

TABLE 4

| Lens surface | R | D | $N_d$ | $V_d$ |
| --- | --- | --- | --- | --- |
| S1 | ∞ | 0.97 | 1.52 | 64.2 |
| S2 | 5.439 | 1.28 | | |
| S3 | 11.325 | 1.03 | 1.52 | 59 |
| S4 | 4.528 | 1.58 | 1.83 | 37.2 |
| S5 | −524.774 | 1.92 | | |
| S6 | −5.831 | 1 | 1.85 | 30.1 |
| S7 | 8.018 | 1.54 | 1.62 | 63.4 |
| S8 | −7.145 | 0.68 | | |
| S9 | −102.769 | 1.66 | 1.57 | 57.5 |
| S10 | −8.831 | 0.12 | | |
| S11 | 25.07 | 1.61 | 1.62 | 58.2 |
| S12 | −25.07 | 0.11 | | |
| S13 | 7.783 | 1.81 | 1.66 | 54.7 |
| S14 | −47.413 | 1.01 | 1.58 | 40.9 |
| S15 | 5.803 | 7.1 | | |

Figure 6A:
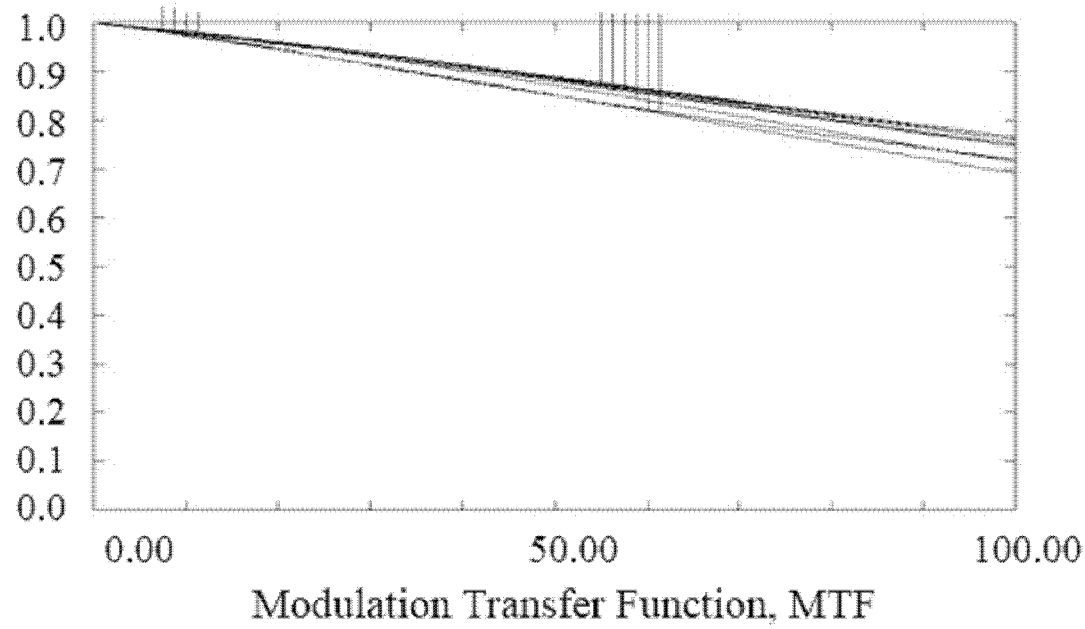
FIGS. 6A through 6F illustrate optical simulation of the zoom lens system illustrated in FIG. 5A according to some embodiments of the present disclosure.
Figure 6B:
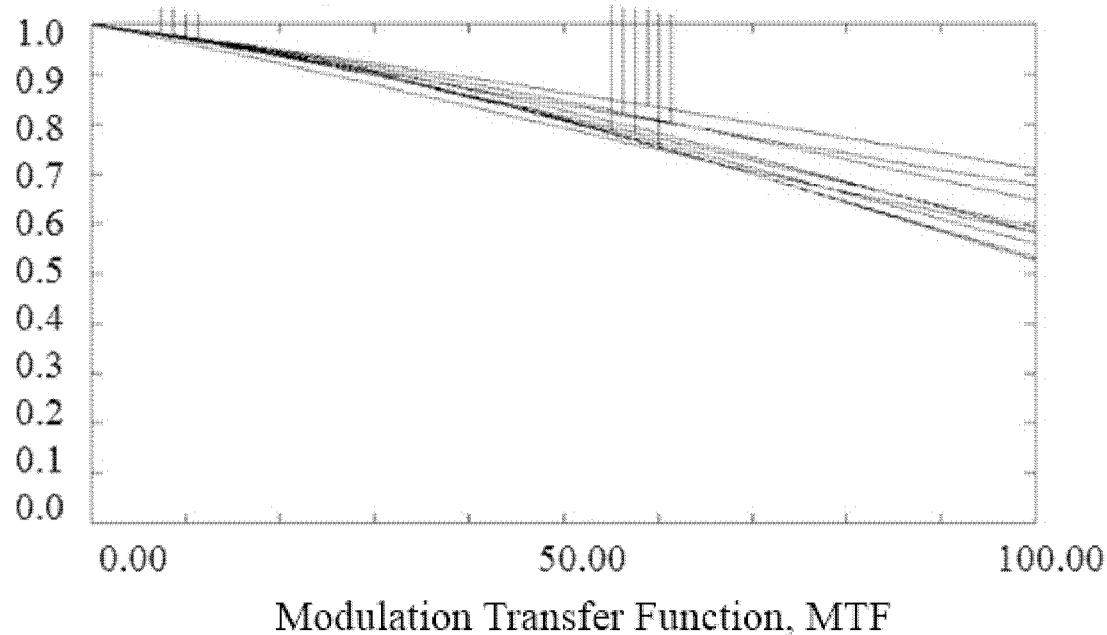

FIGS. 6A through 6F illustrate optical simulation an exemplary zoom lens system illustrated in FIGS. 5A and 5B according to some embodiments of the present disclosure. FIGS. 6A and 6B show Modulation Transfer Function (MTF) performances of the zoom lens system with visible light and infrared, respectively. The MTF performance may indicate the ability of the zoom lens system to reproduce various levels of details of an image captured by an imaging system implementing the zoom lens system. In FIGS. 6A and 6B, the vertical axis represents degree of contrast (also referred to as modulation), and the horizontal axis may represents spatial frequency (also referred to as resolution, in lp/mm). In some embodiments, the MTF may be used to evaluate imaging quality of a zoom lens system. For example, the MTF curves with high degree of contrast and a slight slope may represent high-quality images produced by the zoom lens system.

Figure 6C:
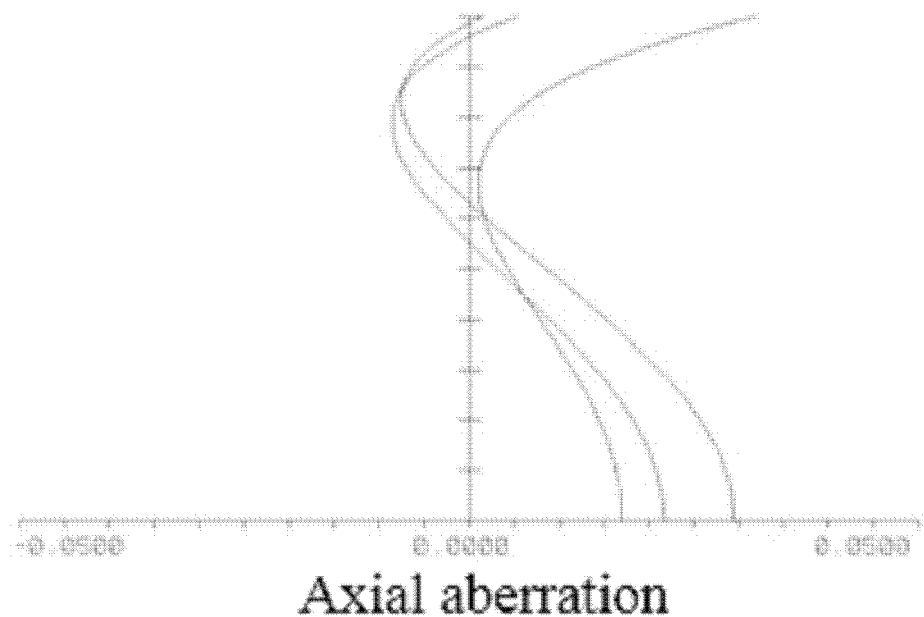

FIG. 6C illustrates axial aberration of the zoom lens system with visible light. The axial aberration may include spherical aberration and axial chromatic aberration. One or more beams of visible light may be used to determine the axial aberration of the zoom lens system. In some embodiments, visible light with wavelength of 486 nm, visible light with wavelength of 588 nm, and visible light with wavelength of 656 nm can be used to determine the axial aberration. In FIG. 6C, the vertical axis represents radius of the visible light (in mm), and the horizontal axis represents axial aberration (in mm).

Figure 6D:
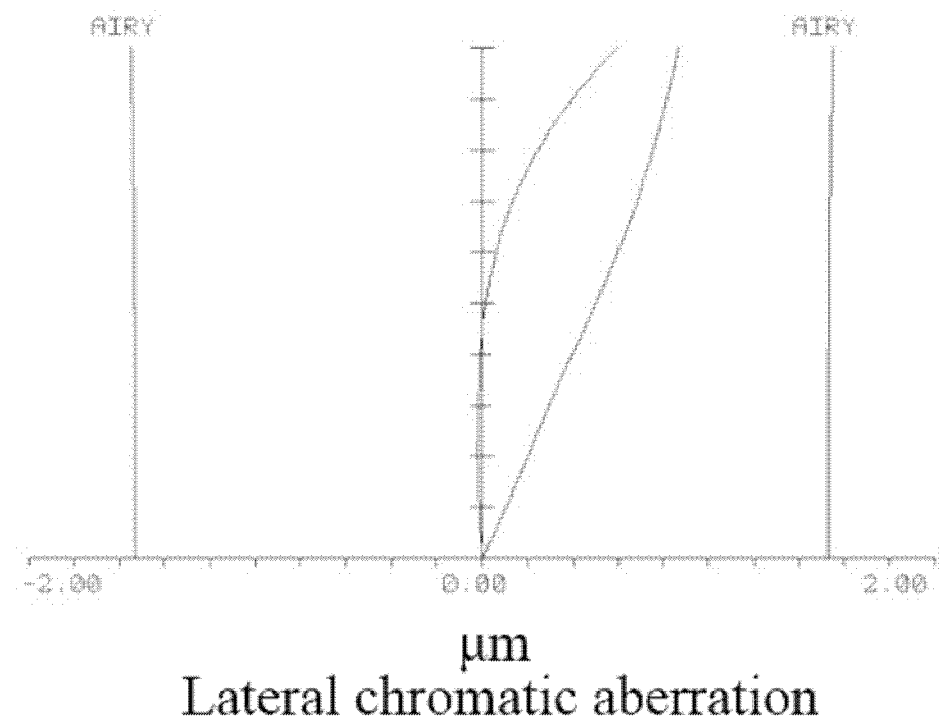

FIG. 6D illustrates lateral chromatic aberration of the zoom lens system with visible light. One or more beams of visible light may be used to determine the lateral chromatic aberration of the zoom lens system. In some embodiments, visible light with wavelength of 486 nm, visible light with wavelength of 588 nm, and visible light with wavelength of 656 nm can be used to determine the lateral chromatic aberration. As shown in FIG. 6D, the vertical axis represents radius of the visible light beam(s) (in μm), and the horizontal axis represents lateral chromatic aberration (in μm).

Figure 6E:
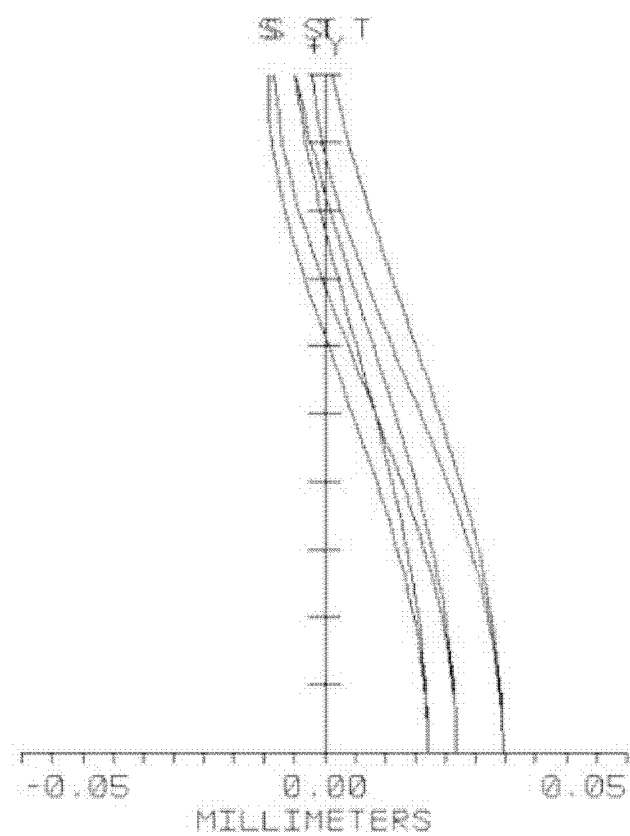

FIG. 6E illustrates field curvature of the zoom lens system. One or more beams of visible light may be used to determine the field curvature of the zoom lens system. In some embodiments, visible light with wavelength of 486 nm, visible light with wavelength of 588 nm, and visible light with wavelength of 656 nm can be used to determine the field curvature. In FIG. 6E, the vertical axis represents the scale of field of view (in μm), and the horizontal axis represents field curvature (in mm).

Figure 6F:
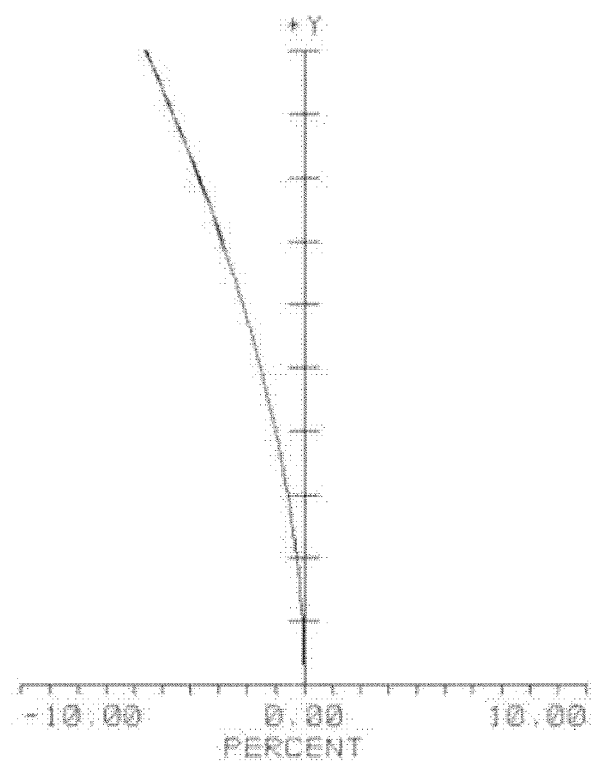

FIG. 6F illustrates distortion of the zoom lens system. One or more beams of visible light may be used to determine the distortion of the zoom lens system. In some embodiments, visible light with wavelength of 486 nm, visible light with wavelength of 588 nm, and visible light with wavelength of 656 nm can be used to determine the distortion. In FIG. 6F, the vertical axis represents the scale of field of view (in μm), and the horizontal axis represents distortion (in percentage).

Figure 7:
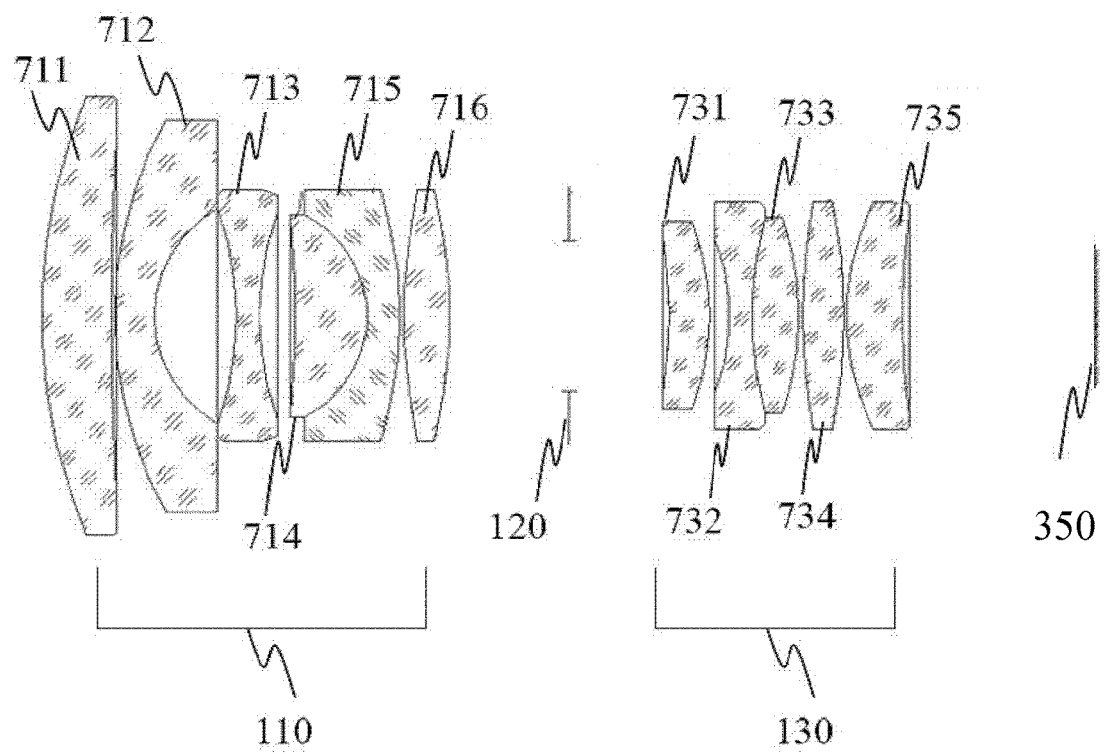
FIG. 7 is a schematic diagram illustrating an exemplary zoom lens system according to some embodiments of the present disclosure.

FIG. 7 is a schematic diagram of another exemplary zoom lens system 100 according to some embodiments of the present disclosure. Referring again to FIG. 1, zoom lens system 100 may include first lens group 110, aperture stop 120, second lens group 130, and other components (not shown). Image plane 350 may be a surface where an image may be captured. For example, a light-sensitive film may be mounted on the image plane 350 for capturing an image. In some embodiments, first lens group 110 may have a positive refractive power, and second lens group 130 may have a positive refractive power.

In some embodiments, first lens group 110 may include one or more lens elements. In some embodiments, the first lens group 110 may include a first lens element 711, a second lens element 712, a third lens element 713, a fourth lens element 714, a fifth lens element 715, and a sixth lens element 716. In some embodiments, second lens group 130 may include a seventh lens element 731, an eighth lens element 732, a ninth lens element 733, a tenth lens element 734, and an eleventh lens element 735.

The lens elements 711-716 and 731-735 may have different refractive powers. In some embodiments, first lens element 711, second lens element 712, third lens element 713, fourth lens element 714, fifth lens element 715, and sixth lens element 716 may have a positive refractive power, a negative refractive power, a negative refractive power, a positive refractive power, a negative refractive power, and a positive refractive power, respectively. In some embodiments, seventh lens element 731, eighth lens element 732, ninth lens element 733, tenth lens element 734, and eleventh lens element 735 may have a positive refractive power, a negative refractive power, a positive refractive power, a positive refractive power, and a positive refractive power, respectively.

The lens elements 711-716 and 731-735 may have different configurations. In some embodiments, first lens element 711 may be a meniscus lens with a convex surface towards an object (i.e., the opposite direction to image plane 350), second lens element 712 may be a meniscus lens with a convex surface towards the object, third lens element 713 may be a biconcave lens, fourth lens element 714 may be a meniscus lens with a convex surface towards image plane 350, fifth lens element 715 may be a meniscus lens with a convex surface towards image plane 350, and sixth lens element 716 may be a biconvex lens. In some embodiments, seventh lens element 731 may be a meniscus lens with a concave surface towards the object, eighth lens element 732 may be a biconcave lens, ninth lens element 733 may be a biconvex lens, tenth lens element 734 may be a biconvex lens, and eleventh element 735 may be a meniscus lens with a convex surface towards the object. In some embodiments, a gap between two lens elements (or between a lens element and a lens component, or between two lens components) may be fixed by one or more spacers. In some embodiments, a first gap may be present between third lens element 713 and fourth lens element 714, and a second gap may be present between fifth lens element 715 and sixth lens element 716. In some embodiments, a third gap may be present between seventh lens element 731 and eighth lens element 732, a fourth gap may be present between ninth lens element 733 and tenth lens element 734, and a fifth gap may be present between tenth lens element 734 and eleventh lens element 735.

In some embodiments, two lens elements may be affixed to each other by adhesive (or any suitable materials or method). In some embodiments, two or more lens elements may be rigidly affixed together and integrated into one lens component. Merely by way of example, fourth lens element 714 and fifth lens element 715 may be affixed to each other (e.g., by glue, UV-curing adhesive, etc.) and integrated into a first lens component. The first lens component may have a positive refractive power. As another example, eighth lens element 732 and ninth lens element 733 may be affixed to each other and integrated into a second lens component. The second lens component may have a negative refractive power.

Figure 8:
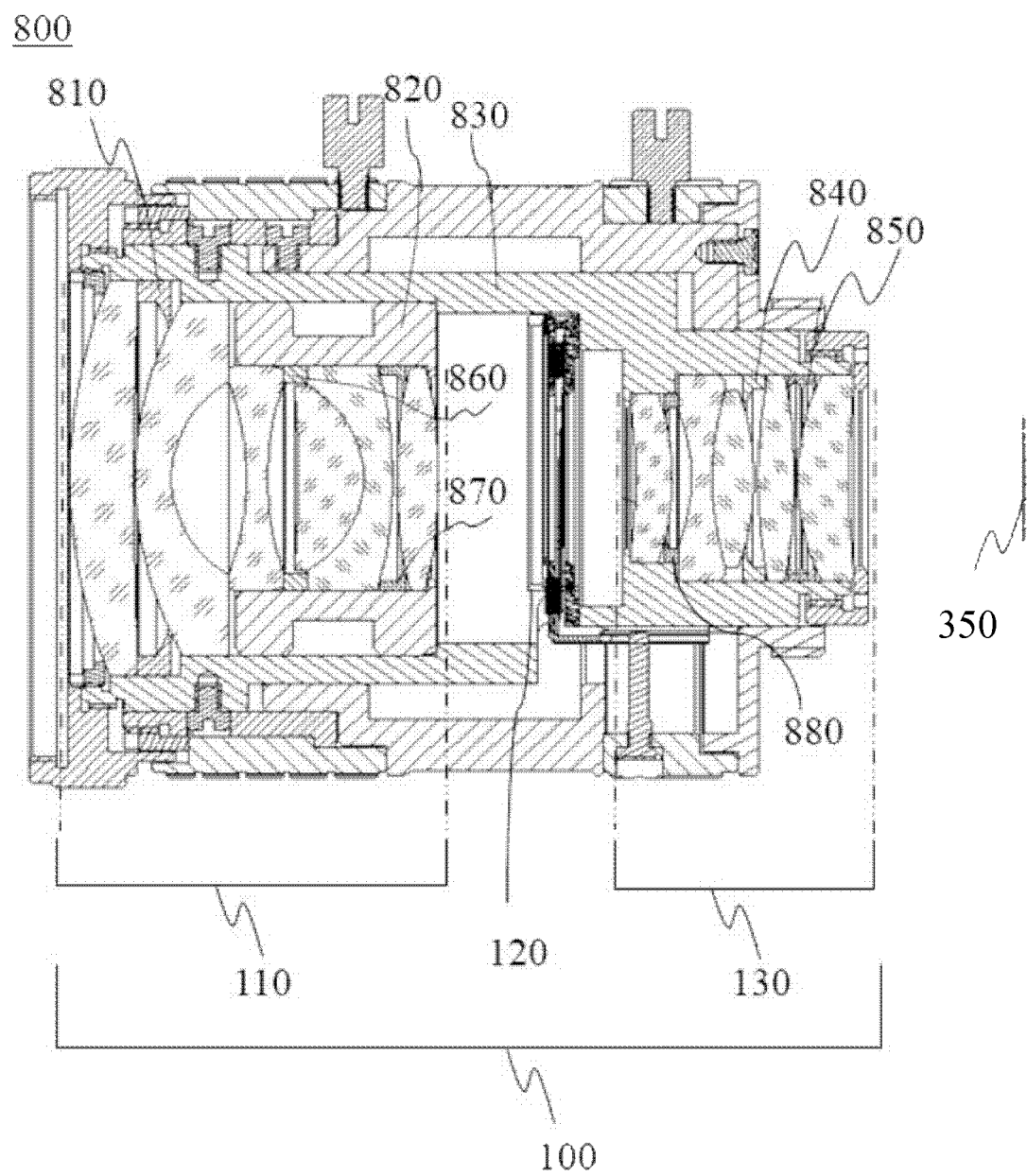
FIG. 8 illustrate an exemplary zoom lens system configuration of an optical imaging device according to some embodiments of the present disclosure.

FIG. 8 illustrates an exemplary zoom lens system configuration of an optical imaging device 800 according to some embodiments of the present disclosure. The optical imaging device may include a zoom lens system 100, a primary lens barrel 830, a secondary lens barrel 820, one or more spacers (e.g., a first spacer 810, a second spacer 840, a third spacer 850, a fourth spacer 860, a fifth spacer 870, a sixth spacer 880), and/or other components. The spacers 810, 840, 850, 860, 870 and 880 may be used to fix the gaps between the lens elements, and to generate (or maintain) air spaces between the lens elements. For example, spacer 810 may be used to fix the gap between first lens element 711 and second lens element 712; spacer 860 may be used to fix the gap between third lens element 713 and fourth lens element 714; spacer 870 may be used to fix the gap between fifth lens element 715 and sixth lens element 716; spacer 880 may be used to fix the gap between seventh lens element 731 and eighth lens element 732; spacer 840 may be used to fix the gap between ninth lens element 733 and tenth lens element 734; spacer 850 may be used to fix the gap between tenth lens element 734 and eleventh lens element 735. In some embodiments, secondary lens barrel 820 may house first lens group 110. In some embodiments, secondary lens barrel 820 may be mounted to primary lens barrel 830.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What we claimed are:

1. A zoom lens system, comprising:
   a first lens group including:
      at least two lens elements having a negative refractive power; and
      at least one lens element having a positive refractive power;
   an aperture stop; and
   a second lens group having a positive refractive power including:
      a first lens element having a positive refractive power;
      a second lens element having a positive refractive power;
      a first lens component having a negative refractive power;

a third lens element having a negative refractive power;
a fourth lens element having a positive refractive power;
a second lens component having a negative refractive power;
a fifth lens element having a positive refractive power; and
a sixth lens element having a negative refractive power, wherein:
the first lens component includes at least one lens element,
the second lens component includes at least one lens element,
the third lens element is a biconcave lens, an Abbe number of the third lens element being greater than 65 and a refractive index of the third lens element being less than 1.55,
the fifth lens element having a positive refractive power and the sixth lens element having a negative refractive power are affixed to each other, and
a distance between the first lens group and the second lens group is not fixed.

2. The zoom lens system of claim 1, wherein:
the first lens element of the second lens group is a biconvex lens, and
a refractive index of the first lens element is no less than 1.7.

3. The zoom lens system of claim 1, wherein:
the second lens element of the second lens group is a biconvex lens,
an Abbe number of the second lens element of the second lens group is greater than 80, and
the second lens element and the first lens component of the second lens group are affixed to each other.

4. The zoom lens system of claim 1, wherein the first lens component of the second lens group includes:
a biconcave lens having a negative refractive power, and
a biconvex lens having a positive refractive power, the biconcave lens and the biconvex lens being affixed to each other.

5. The zoom lens system of claim 1, wherein:
the fourth lens element of the second lens group is a biconvex lens, and
the third lens element and the fourth lens element of the second lens group are affixed to each other.

6. The zoom lens system of claim 1, wherein the second lens component of the second lens group includes:
a first meniscus lens having a positive refractive power,
a second meniscus lens having a negative refractive power, and
the first meniscus lens and the second meniscus lens are affixed to each other.

7. The zoom lens system of claim 1, wherein:
the fifth lens element of the second lens group is a biconvex lens, and
an Abbe number of the fifth lens element is greater than 80.

8. The zoom lens system of claim 1, wherein:
the sixth lens element of the second lens group is a biconcave lens,
an Abbe number of the sixth lens element of the second lens group is less than that of the fifth lens element of the second lens group, and
a refractive index of the sixth lens element of the second lens group is greater than that of the fifth lens element of the second lens group.

9. The zoom lens system of claim 1, wherein the first lens group includes:
a first meniscus lens having a negative refractive power,
a biconcave lens having a negative refractive power, and
a second meniscus lens having a positive refractive power, convex surfaces of the first and second meniscus lenses facing against an image plane.

10. A zoom lens system, comprising:
a first lens group including:
at least two lens elements of negative refractive power; and
at least one lens element of a positive refractive power;
an aperture stop;
a second lens group having a positive refractive power including:
a first lens element having a negative refractive power;
a second lens element having a positive refractive power;
a third lens element having a positive refractive power;
a fourth lens element having a positive refractive power;
a fifth lens element having a positive refractive power; and
a sixth lens element having a negative refractive power, wherein:
a distance between the first lens group and the second lens group is not fixed; and
wherein the zoom lens system satisfies $0.7 \leq |F_{eff}/F_1| < 1.7$, and $0.3 < |F_{eff}/F_c| < 1.2$, $F_{eff}$ being an effective focal length of the zoom lens system, $F_1$ being an effective focal length of the first lens group, and Fc being an effective focal length of the second lens group.

11. The zoom lens system of claim 10, wherein the first lens group includes:
a plano-concave lens, a concave surface of the plano-convex lens facing an image plane,
two meniscus lenses, convex surfaces of the two meniscus lenses facing against an image plane, and
the two meniscus lenses are affixed to each other.

12. The zoom lens system of claim 11, wherein:
a first concave surface of one of the two meniscus lens and a second concave surface of the other one of the two meniscus lens are integrated into a lens component by adhesive, and
the lens component has a positive refractive power.

13. The zoom lens system of claim 10, wherein:
the first lens element of the second group is a biconcave lens,
the second lens element of the second group is a biconvex lens,
the third lens element of the second group is a meniscus lens,
the fourth lens element of the second group is a biconvex lens,
the fifth lens element of the second group is a biconvex lens, and
the sixth lens element of the second group is a biconcave lens.

14. The zoom lens system of claim 10, wherein:
the first lens element of the second group and the second lens element of the second group are affixed to each other, and
the fifth lens element of the second group and the sixth lens element of the second group are affixed to each other.

15. A zoom lens system, comprising:
a first lens group including:
- a first meniscus lens having a positive refractive power;
- a second meniscus lens having a negative refractive power;
- a biconcave lens having a negative refractive power;
- a first lens component having a positive refractive power; and
- a biconvex lens having a positive refractive power, convex surfaces of the first and second meniscus lenses facing against an image plane;

an aperture stop; and
a second lens group having a positive refractive power including:
- a first lens element having a positive refractive power;
- a second lens component having a negative refractive power;
- a second lens element having a positive refractive power; and
- a third lens element having a positive refractive power, wherein:
the second lens component includes at least one lens element, and a distance between the first lens group and the second lens group is not fixed.

16. The zoom lens system of claim 15, the first lens component of the first lens group includes:
a third meniscus lens having a positive refractive power; and a fourth meniscus lens having a negative refractive power, the third meniscus lens and the fourth meniscus lens being affixed to each other.

17. The zoom lens system of claim 15, the second lens component of the second lens group includes:
a biconcave lens having a negative refractive power; and
a biconvex lens having a positive refractive power, the biconcave lens and the biconvex lens being affixed to each other.

* * * * *